(12) United States Patent
Tsukagoshi

(10) Patent No.: US 10,390,057 B2
(45) Date of Patent: Aug. 20, 2019

(54) TRANSMISSION APPARATUS, TRANSMISSION METHOD, RECEPTION APPARATUS, AND RECEPTION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/544,285

(22) PCT Filed: Feb. 9, 2016

(86) PCT No.: PCT/JP2016/053858
§ 371 (c)(1),
(2) Date: Jul. 18, 2017

(87) PCT Pub. No.: WO2016/132976
PCT Pub. Date: Aug. 25, 2016

(65) Prior Publication Data
US 2018/0014040 A1    Jan. 11, 2018

(30) Foreign Application Priority Data
Feb. 17, 2015   (JP) ................................ 2015-029106

(51) Int. Cl.
*H04N 19/70*      (2014.01)
*H04N 19/85*      (2014.01)
(Continued)

(52) U.S. Cl.
CPC ......... *H04N 21/2343* (2013.01); *H04N 19/70* (2014.11); *H04N 19/85* (2014.11);
(Continued)

(58) Field of Classification Search
CPC ............. H04N 21/2343; H04N 21/236; H04N 21/434; H04N 21/4402; H04N 9/67
See application file for complete search history.

(56) References Cited

U.S. PATENT DOCUMENTS 10,027,856 B2 *   7/2018   Tsukagoshi ............ H04N 5/202
2008/0095408 A1 * 4/2008   Yokohata ............... H04N 5/144
                                                           382/106
(Continued)

FOREIGN PATENT DOCUMENTS

| JP | 2014-534719 A | 12/2014 | |
| JP | 2015-8361 A | 1/2015 | |
| KR | WO2015/072754 | * 5/2015 | ............... H04N 7/01 |

OTHER PUBLICATIONS

Author: Society of Motion Picture and Television Engineers (SMPTE) Title: Study Group Report High-Dynamic-Range (HDR) Imaging Ecosystem Date: Sep. 19, 2015 (Year: 2015).*

(Continued)

*Primary Examiner* — Nathan J Flynn
*Assistant Examiner* — Tung T Trinh
(74) *Attorney, Agent, or Firm* — Oblon, McClelland, Maier & Neustadt, L.L.P.

(57) ABSTRACT

Reception-side processing performed in a case where transmission of standard dynamic range video data and transmission of high dynamic range video data coexist in a time sequence is simplified.
SDR transmission video data is converted into SDR transmission video data through dynamic range conversion. The SDR transmission video data is the one obtained by performing, on SDR video data, photoelectric conversion in accordance with an SDR photoelectric conversion characteristic. In this case, the conversion is performed on the basis of conversion information for converting a value of conversion data in accordance with the SDR photoelectric conversion characteristic into a value of conversion data in accordance with an HDR photoelectric conversion characteristic. A video stream is obtained by performing encoding pro-
(Continued)

cessing on HDR transmission video data. A container having a predetermined format and including this video stream is transmitted.

16 Claims, 18 Drawing Sheets

(51) Int. Cl.
*H04N 21/236* (2011.01)
*H04N 21/434* (2011.01)
*H04N 21/2343* (2011.01)
*H04N 21/4402* (2011.01)

(52) U.S. Cl.
CPC ......... *H04N 21/236* (2013.01); *H04N 21/434* (2013.01); *H04N 21/4402* (2013.01)

(56) References Cited

U.S. PATENT DOCUMENTS

| | | | | |
|---|---|---|---|---|
| 2009/0059026 A1* | 3/2009 | Katagiri | ................. | H04N 19/40 348/222.1 |
| 2012/0105639 A1* | 5/2012 | Stein | ...................... | H04N 5/235 348/148 |
| 2013/0148029 A1* | 6/2013 | Gish | ........................ | G09G 5/02 348/708 |
| 2014/0022460 A1* | 1/2014 | Li | ........................... | G06T 5/009 348/708 |
| 2014/0105289 A1* | 4/2014 | Su | ........................ | H04N 19/105 375/240.12 |
| 2015/0042890 A1 | 2/2015 | Messmer | | |
| 2015/0103919 A1* | 4/2015 | Hattori | ................. | H04N 19/124 375/240.25 |
| 2015/0245050 A1* | 8/2015 | Tourapis | ................ | H04N 19/98 375/240.02 |
| 2015/0312591 A1* | 10/2015 | Takahashi | ............ | H04N 19/597 375/240.16 |
| 2016/0210730 A1* | 7/2016 | Eto | ........................... | G06F 3/14 |
| 2016/0301959 A1* | 10/2016 | Oh | .................. | H04N 21/234327 |
| 2016/0344990 A1* | 11/2016 | Kozuka | ............ | H04N 21/43635 |
| 2016/0345032 A1* | 11/2016 | Tsukagoshi | ............ | H04N 21/84 |

OTHER PUBLICATIONS

Author: T. Borer and A. Cotton of British Broadcasting Corporation (BBC) Title: WHP 309, A "Display Independent" High Dynamic Range Television System Date: Sep. 2015 (Year: 2015).*

Tim Borer, "Non-linear Opto-Electrical Transfer Functions for High Dynamic Range Television," BBC Research & Development White Paper WHP 283, British Broadcasting Corporation, Jul. 2014 (23 pages).

International Search Report dated Apr. 26, 2016 in PCT/JP2016/053858 filed Feb. 9, 2016.

* cited by examiner

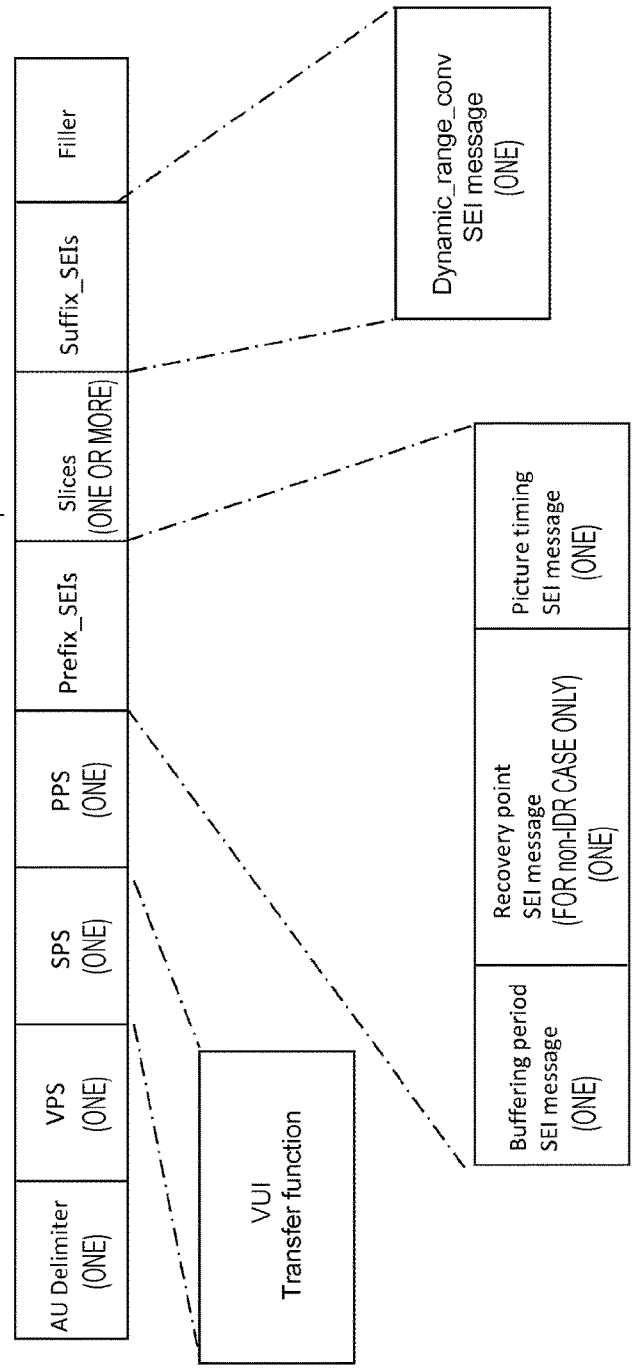

FIG. 7

Dynamic_range_conv SEI syntax

| Syntax | No. of Bits | Format |
|---|---|---|
| Dynamic_range_conv SEI ( ) { | | |
|   Dynamic_range_conv_id | ue(v) | |
|   Dynamic_range_conv_cancel_flag | u(1) | bslbf |
|   if( ! Dynamic_range_conv_cancel_flag ) { | | |
|     coded_bit_depth | 8 | uimsbf |
|     reference_level | 14 | uimsbf |
|     ratio_conversion_flag | 1 | bslbf |
|     conversion_table_flag | 1 | bslbf |
|     branch_level | 16 | uimsbf |
|     if( ratio_conversion_flag ) { | | |
|       level_conversion_ratio | 8 | uimsbf |
|     } | | |
|     if (conversion_table_flag) { | | |
|       table_size | 16 | uimsbf |
|       for ( I = 0; I < table_size ; I++ ) { | | |
|         level_R[i] | 16 | uimsbf |
|         level_G[i] | 16 | uimsbf |
|         level_B[i] | 16 | uimsbf |
|       } | | |
|     } | | |
|   } | | |
| } | | |

FIG. 8

| semantics | |
|---|---|
| coded_data_bit_depth | BIT DEPTH OF ENCODED PIXELS |
| reference_level | REFERENCE LUMINANCE LEVEL VALUE |
| branch_level | BRANCH LEVEL |
| ratio_conversion_flag | INDICATES THAT SIMPLE CONVERSION IS PERFORMED |
| conversion_table_flag | INDICATES THAT CONVERSION TABLE IS USED |
| level_conversion_ratio | INDICATES RATIO OF LEVEL CONVERSION |
| table_size | INDICATES THE NUMBER OF INPUTS IN CONVERSION TABLE |
| level_R[i] | INDICATES VALUE AFTER CONVERSION OF Red component |
| level_G[i] | INDICATES VALUE AFTER CONVERSION OF Green component |
| level_B[i] | INDICATES VALUE AFTER CONVERSION OF Blue component |

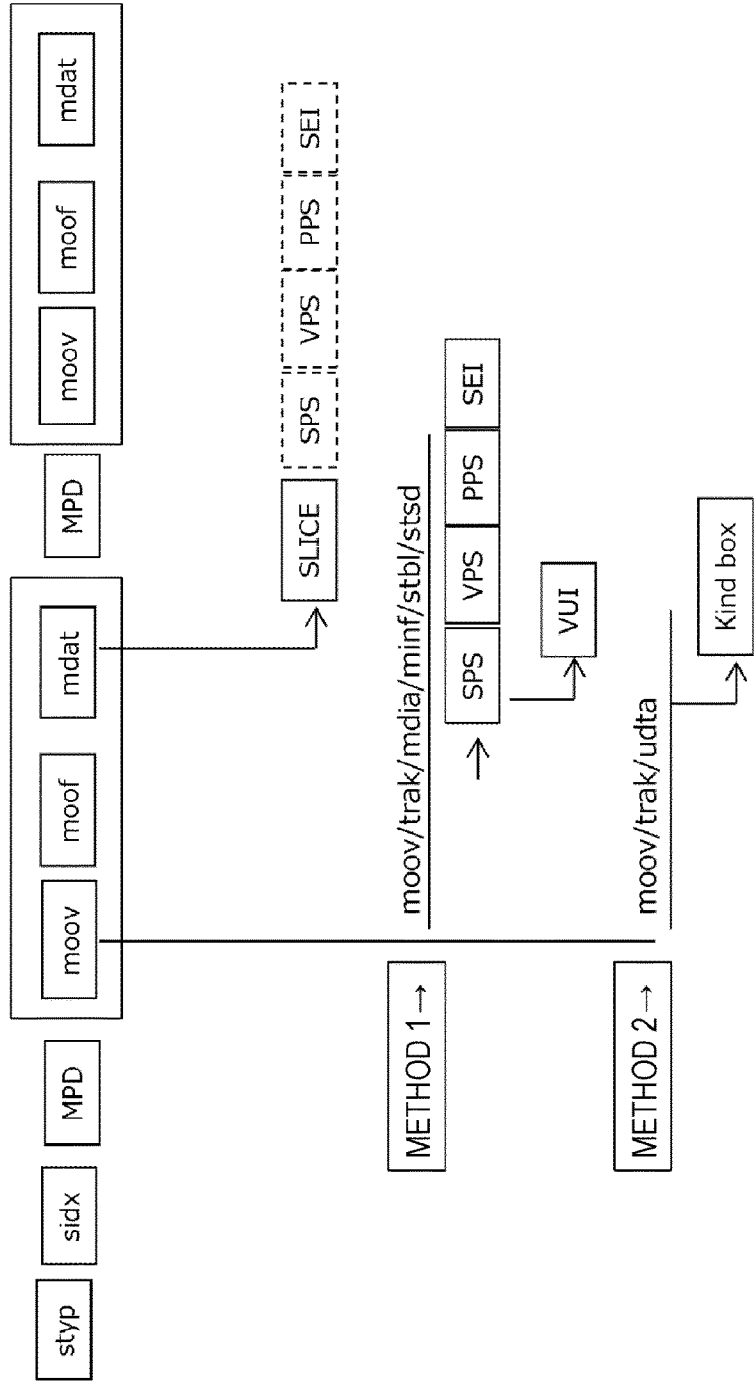

FIG. 12

MPD syntax

```
<MPD>
  <Period>
    <AdaptationSet mimeType="video/mp4" group="1">
      <SupplementaryDesctiptor schemeIdUri="urn:brdcst:codectype" value="hevc"/>
      <SupplementaryDesctiptor schemeIdUri="urn:brdcst:video:highdynamicrange" value="HDR"/>
      <SupplementaryDesctiptor schemeIdUri="urn:brdcst:video:transferfunction" value="EOTFtype"/>
      <SupplementaryDesctiptor schemeIdUri="urn:brdcst:video:xycolourprimaries" value="ColorGamut"/>
      <SupplementaryDesctiptor schemeIdUri="urn:brdcst:video:matrixcoefficients" value="ColorMatrix"/>
      <SupplementaryDesctiptor schemeIdUri="urn:brdcst:video:referencelevel" value="RefLevel"/>
      <SupplementaryDesctiptor schemeIdUri="urn:brdcst:video:branchlevel" value="BranchLevel"/>
      <SupplementaryDesctiptor schemeIdUri="urn:brdcst:video:streamdependency" value="DependType"/>
      <SupplementaryDesctiptor schemeIdUri="urn:brdcst:video:originaldynamicrange" value="DrangeType"/>
      <Representation id="1" bandwidth="20000000">
        <baseURL>video/jp/20000000.mp4</BaseURL>
      </Representation>
    </AdaptationSet>
    <AdaptationSet mimeType="video/mp4" group="2">
      <SupplementaryDesctiptor schemeIdUri="urn:brdcst:codectype" value="hevc"/>
      <SupplementaryDesctiptor schemeIdUri="urn:brdcst:video:highdynamicrange" value="HDR"/>
      <SupplementaryDesctiptor schemeIdUri="urn:brdcst:video:transferfunction" value="EOTFtype"/>
      <SupplementaryDesctiptor schemeIdUri="urn:brdcst:video:xycolourprimaries" value="ColorGamut"/>
      <SupplementaryDesctiptor schemeIdUri="urn:brdcst:video:matrixcoefficients" value="ColorMatrix"/>
      <SupplementaryDesctiptor schemeIdUri="urn:brdcst:video:referencelevel" value="RefLevel"/>
      <SupplementaryDesctiptor schemeIdUri="urn:brdcst:video:streamdependency" value="DependType"/>
      SupplementaryDesctiptor schemeIdUri="urn:brdcst:video:originaldynamicrange" value="DrangeType"/>
      <Representation id="2" bandwidth="10000000">
        <baseURL>video/jp/10000000.mp4</BaseURL>
      </Representation>
    </AdaptationSet>
  </Period>
</MPD>
```

FIG. 13

Value SEMANTICS OF SupplementaryDescriptor

"urn:brdcst:video:HighDynamicRange"
  "HDR"   or   "1"         CURRENT STREAM IS HDR
  "SDR"   or   "0"         CURRENT STREAM IS SDR "urn:brdcst:video:transferfunction"
  "bt709"       or   "1"   BT.709-5 Transfer Function
  "bt2020-10"   or   "14"  10bit BT.2020 Transfer Function
  "st2084"      or   "16"  SMPTE 2084 Transfer Function "urn:brdcst:video:xycolourprimaries"
  "bt709"   or   "1"       BT.709-5
  "bt2020"  or   "9"       BT.2020
  "st428"   or   "10"      SMPTE 428 or XYZ "urn:brdcst:video:matrixcoefficients"
  "bt709"   or   "1"       BT.709-5
  "bt2020n" or   "9"       BT.2020 non-constant luminance
  "st2085"  or   "11"      SMPTE 2085 or $Y'D'_ZD'_X$ "urn:brdcst:video:referencelevel"
  "value"                  SPECIFIED WITH VALUE OF 0 TO 100 IN RELATIVE RANGE NORMALIZED TO "1" AT MAXIMUM,
                           AND VALUE OBTAINED BY DIVIDING THIS VALUE BY 100 IS RECOGNIZED AS RELATIVE REFERENCE LEVEL.

"urn:brdcst:video:branchlevel"
  "value"                  SPECIFIED WITH VALUE OF 0 TO 100 IN RELATIVE RANGE NORMALIZED TO "1" AT MAXIMUM,
                           AND VALUE OBTAINED BY DIVIDING THIS VALUE BY 100 IS RECOGNIZED AS RELATIVE BRANCH LEVEL.

"urn:brdcst:video:streamdependency"
  "base"     or   "0"      independent (or base) stream
  "extended" or   "1"      dependent (or extended to base) stream "urn:brdcst:video:originaldynamicrange"
  "sdr"                    original dynamic range is SDR
  "hdr"                    original dynamic range is HDR

FIG. 17 dynamic_range_conversion descriptor syntax

| Syntax | No. of Bits | Format |
|---|---|---|
| dynamic_range_conversion( ) { | | |
|   descriptor_tag | 8 | bslbf |
|   descriptor_length | 8 | bslbf |
|   highdynamicrange | 8 | uimsbf |
|   transferfunction | 8 | uimsbf |
|   xycolourprimaries | 8 | uimsbf |
|   matrixcoefficients | 8 | uimsbf |
|   referencelevel | 8 | uimsbf |
|   branchlevel | 8 | uimsbf |
|   streamdependency | 4 | uimsbf |
|   originaldynamicrange | 4 | uimsbf |
| } | | |
| } | | |

FIG. 18

| Semantics | | |
|---|---|---|
| highdynamicrange | "1" | CURRENT STREAM IS HDR |
| | "0" | CURRENT STREAM IS SDR |
| transferfunction | "1" | BT.709-5 Transfer Function |
| | "14" | 10bit BT.2020 Transfer Function |
| | "16" | SMPTE 2084 Transfer Function |
| xycolourprimaries | "1" | BT.709-5 |
| | "9" | BT.2020 |
| | "10" | SMPTE 428 or XYZ |
| matrixcoefficients | "1" | BT.709-5 |
| | "9" | BT.2020 non-constant luminance |
| | "11" | SMPTE 2085 or Y'D'$_z$D'$_x$ |
| referencelevel | 0~100 | SPECIFIED WITH VALUE OF 0 TO 100 IN RELATIVE RANGE NORMALIZED TO "1" AT MAXIMUM, AND VALUE OBTAINED BY DIVIDING THIS VALUE BY 100 IS RECOGNIZED AS REFERENCE LEVEL. |
| branchlevel | 0~100 | SPECIFIED WITH VALUE OF 0 TO 100 IN RELATIVE RANGE NORMALIZED TO "1" AT MAXIMUM, AND VALUE OBTAINED BY DIVIDING THIS VALUE BY 100 IS RECOGNIZED AS RELATIVE BRANCH LEVEL. |
| streamdependency | "0" | independent (or base) stream |
| | "1" | dependent (or extended to base) stream |
| originaldynamicrange | "0" | original dynamic range is SDR |
| | "1" | original dynamic range is HDR |

TRANSMISSION APPARATUS, TRANSMISSION METHOD, RECEPTION APPARATUS, AND RECEPTION METHOD

TECHNICAL FIELD

The present technology relates to a transmission apparatus, a transmission method, a reception apparatus, and a reception method, and particularly, to a transmission apparatus or the like that transmits standard dynamic range video data.

BACKGROUND ART

Conventionally, it has been considered to transmit transmission video data obtained by applying high dynamic range photoelectric conversion to high dynamic range video data. Hereinafter, a high dynamic range is appropriately referred to as "HDR". For example, there is a description about an HDR photoelectric conversion characteristic (new gamma characteristic) in Non-Patent Document 1. The HDR photoelectric conversion characteristic includes a region compatible with a conventional photoelectric conversion characteristic (gamma characteristic), taking into account reception by a conventional receiver.

CITATION LIST

Non-Patent Document

Non-Patent Document 1: Tim Borer, "Non-Linear Opto-Electrical Transfer Functions for High Dynamic Range Television", Research & Development White Paper WHP 283, July 2014

SUMMARY OF THE INVENTION

Problems to be Solved by the Invention

An object of the present technology is to simplify reception-side processing performed in a case where transmission of standard dynamic range video data and transmission of high dynamic range video data are performed by a single transmission method.

Solutions to Problems

A concept of the present technology lies in a transmission apparatus including:

a dynamic range conversion unit configured to obtain high dynamic range transmission video data by performing dynamic range conversion on standard dynamic range transmission video data on the basis of conversion information for converting a value of conversion data in accordance with a standard dynamic range photoelectric conversion characteristic into a value of conversion data in accordance with a high dynamic range photoelectric conversion characteristic, the standard dynamic range transmission video data being obtained by performing, on standard dynamic range video data, photoelectric conversion in accordance with the standard dynamic range photoelectric conversion characteristic;

an encoding unit configured to obtain a video stream by performing encoding processing on the high dynamic range transmission video data; and a transmission unit configured to transmit a container having a predetermined format and including the video stream.

According to the present technology, the dynamic range conversion unit can obtain the high dynamic range transmission video data by performing the dynamic range conversion on the standard dynamic range transmission video data obtained by performing, on the standard dynamic range video data, the photoelectric conversion in accordance with the standard dynamic range photoelectric conversion characteristic. In such a case, the conversion is performed on the basis of the conversion information for converting the value of the conversion data in accordance with the standard dynamic range photoelectric conversion characteristic into the value of the conversion data in accordance with the high dynamic range photoelectric conversion characteristic. For example, the conversion information may be of a conversion coefficient or a conversion table.

The encoding unit can obtain the video stream by performing the encoding processing on the high dynamic range transmission video data. The transmission unit transmits the container having the predetermined format and including this video stream. For example, the container may be MP4 used for the Internet distribution or the like, a transport stream (MPEG-2 TS) adopted by a digital broadcasting standard, or a container in any other format.

According to the present technology as described above, the standard dynamic range transmission video data is transmitted after being converted into the high dynamic range transmission video data. Even when transmitting the standard dynamic range video data, therefore, the reception side can perform similar processing to that in transmission of high dynamic range video data. This makes it possible to simplify the reception-side processing performed in a case where transmission of the standard dynamic range video data and transmission of the high dynamic range video data coexist in a time sequence.

Note that according to the present technology, for example, an information insertion unit may be further included. The information insertion unit inserts, into the video stream and/or the container, the conversion information for converting the value of the conversion data in accordance with the standard dynamic range photoelectric conversion characteristic into the value of the conversion data in accordance with the high dynamic range photoelectric conversion characteristic. In a case where the conversion information is inserted as described above, the reception side can easily perform processing for converting the high dynamic range transmission video data into the standard dynamic range transmission video data with this conversion information and displaying a standard dynamic range image.

Furthermore, according to the present technology, for example, the information insertion unit may further insert, into the container, information indicating that the video stream supports a high dynamic range. This information allows the reception side to easily recognize that the video stream supports the high dynamic range.

Furthermore, according to the present technology, for example, the information insertion unit may further insert, into the container, information indicating a high dynamic range electro-optical conversion characteristic corresponding to the high dynamic range photoelectric conversion characteristic. This information allows the reception side to easily recognize the high dynamic range electro-optical conversion characteristic corresponding to the high dynamic range photoelectric conversion characteristic.

Furthermore, according to the present technology, for example, the information insertion unit may further insert, into the container, information indicating that original video data is the standard dynamic range video data. This information allows the reception side to easily recognize that the original video data is the standard dynamic range video data.

Furthermore, another concept of the present technology lies in a reception apparatus including:

a reception unit configured to receive a container having a predetermined format and including a video stream obtained by encoding high dynamic range transmission video data;

a decoding unit configured to obtain the high dynamic range transmission video data by performing decoding processing on the video stream;

a dynamic range conversion unit configured to obtain standard dynamic range transmission video data by performing dynamic range conversion on the high dynamic range transmission video data obtained by the decoding unit; and an electro-optical conversion unit configured to obtain display standard dynamic range video data by performing, on the standard dynamic range transmission video data, electro-optical conversion in accordance with a standard dynamic range electro-optical conversion characteristic, the standard dynamic range transmission video data being obtained by the dynamic range conversion unit.

According to the present technology, the reception unit receives the container having the predetermined format and including the video stream obtained by encoding the high dynamic range transmission video data. The decoding unit can obtain the high dynamic range transmission video data by performing the decoding processing on the video stream.

The dynamic range conversion unit can obtain the standard dynamic range transmission video data by performing the dynamic range conversion on the high dynamic range transmission video data obtained by the decoding unit. Then, the electro-optical conversion unit can obtain the display standard dynamic range video data by performing, on the standard dynamic range transmission video data, the electro-optical conversion in accordance with the standard dynamic range electro-optical conversion characteristic.

According to the present technology as described above, the standard dynamic range transmission video data is obtained by performing the dynamic range conversion on the high dynamic range transmission video data obtained by the decoding processing. Accordingly, even in the case of being transmitted as the high dynamic range transmission video data, it is possible to display a standard dynamic range image satisfactorily.

Note that according to the present technology, for example, the high dynamic range transmission video data obtained by the decoding unit may be obtained by performing dynamic range conversion processing on the standard dynamic range transmission video data on the basis of conversion information for converting a value of conversion data in accordance with a standard dynamic range photoelectric conversion characteristic into a value of conversion data in accordance with a high dynamic range photoelectric conversion characteristic. The standard dynamic range transmission video data is obtained by performing, on standard dynamic range video data, photoelectric conversion in accordance with the standard dynamic range photoelectric conversion characteristic.

Furthermore, according to the present technology, for example, the conversion information may be inserted into the video stream and/or the container. A conversion information extraction unit to extract the conversion information from the video stream and/or the container may be further included. The dynamic range conversion unit may perform dynamic range conversion on the basis of the conversion information extracted by the conversion information extraction unit.

EFFECTS OF THE INVENTION

According to the present technology, it is possible to simplify reception-side processing performed in a case where transmission of standard dynamic range video data and transmission of high dynamic range video data coexist in a time sequence. Note that the effects described in this specification are merely examples and not limited thereto, and additional effects may also be included.

BRIEF DESCRIPTION OF DRAWINGS

FIG. 6 is a diagram illustrating an access unit at the head of a GOP in a case where an encoding method is HEVC.

FIG. 7 is a diagram illustrating an exemplary structure of a dynamic range conversion SEI message.

FIG. 8 is a diagram illustrating contents of main information in the exemplary structure of the dynamic range conversion SEI message.

FIG. 11 is a diagram for describing a media file entity for a fragmented MP4 (Fragmented MP4) case (broadcasting).

FIG. 12 is a diagram illustrating an exemplary description of the MPD file.

FIG. 13 is a diagram illustrating "Value" semantics of "SupplementaryDescriptor".

FIG. 17 is a diagram illustrating an exemplary structure of a dynamic range conversion descriptor.

FIG. 18 is a diagram illustrating contents of main information in the exemplary structure of the dynamic range conversion descriptor.

MODE FOR CARRYING OUT THE INVENTION

Hereinafter, a mode for carrying out the invention (hereinafter referred to as "embodiment") will be described. Note that the description will be given in the following order.

1. Embodiment
2. Modification

<1. Embodiment>

[Overview of the MPEG-DASH-Based Stream Distribution System]

First, an overview of an MPEG-DASH-based stream distribution system to which the present technology can be applied will be described.

Figure 1:
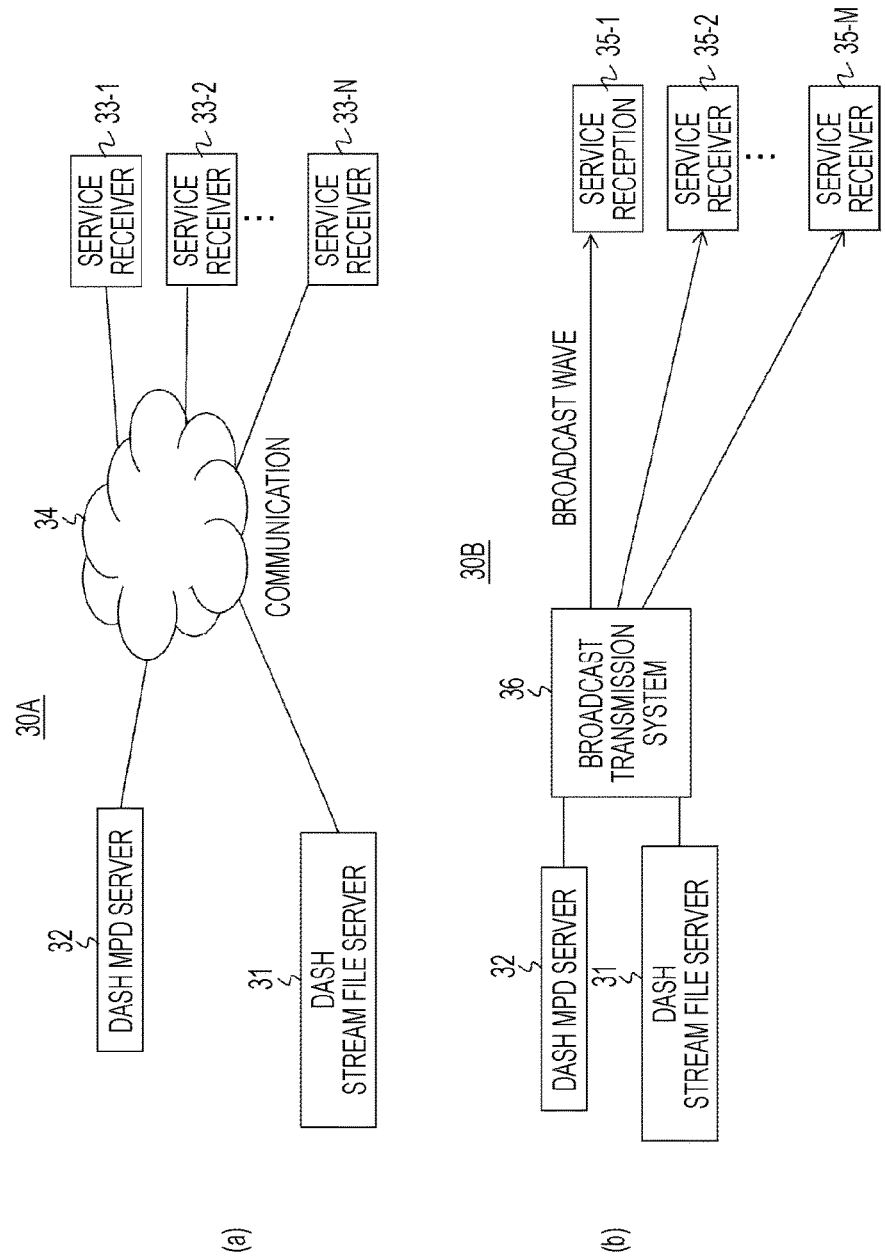
FIGS. 1(a) and 1(b) are block diagrams illustrating exemplary configurations of an MPEG-DASH-based stream distribution system.

FIG. 1(a) illustrates an exemplary configuration of an MPEG-DASH-based stream distribution system 30A. In this exemplary configuration, a media stream and an MPD file are transmitted through a communication network transmission line (communication transmission line). This stream distribution system 30A has a configuration in which N number of service receivers 33-1, 33-2, . . . , and 33-N are connected to a DASH stream file server 31 and a DASH MPD server 32 via a content delivery network (CDN) 34.

The DASH stream file server 31 generates a stream segment conforming to DASH specifications (hereinafter, appropriately referred to as a "DASH segment") on the basis of media data (video data, audio data, subtitle data, and the like) of a predetermined content, and transmits the segment in response to an HTTP request from the service receiver. This DASH stream file server 31 may be a server dedicated to streaming or may also be used as a web (Web) server.

Furthermore, in response to the request for the segment of the predetermined stream transmitted from the service receiver 33 (33-1, 33-2, . . . , and 33-N) via the CDN 34, the DASH stream file server 31 transmits the segment of the stream to the receiver, which is the request source, through the CDN 34. In this case, the service receiver 33 makes the request by referring to values of rates described in a media presentation description (MPD) file and selecting a stream with an optimal rate according to the condition of a network environment where the client is placed.

The DASH MPD server 32 is a server that generates an MPD file for obtaining the DASH segment generated in the DASH stream file server 31. The MPD file is generated on the basis of content metadata transmitted from a content management server (not illustrated) and an address (url) of the segment generated in the DASH stream file server 31. Note that the DASH stream file server 31 and the DASH MPD server 32 may be physically an identical server.

The MPD format uses an element called a representation (Representation) for each of the streams such as videos and audio to describe a corresponding attribute. In the MPD file, for example, the representation is separated for each of a plurality of video data streams having different rates to describe their respective rates. The service receiver 33 can refer to the values of these rates and select an optimal stream according to the condition of the network environment where the service receiver 33 is placed, as described above.

FIG. 1(b) illustrates an exemplary configuration of an MPEG-DASH-based stream distribution system 30B. In this exemplary configuration, a media stream and an MPD file are transmitted through an RF transmission line (broadcast transmission line). This stream distribution system 30B includes a broadcast transmission system 36 to which a DASH stream file server 31 and a DASH MPD server 32 are connected, and M number of service receivers 35-1, 35-2, . . . , and 35-M.

In the case of this stream distribution system 30B, the broadcast transmission system 36 transmits a stream segment and an MPD file on a broadcast wave. The stream segment (DASH segment) conforming to the DASH specifications is generated by the DASH stream file server 31. The MPD file is generated by the DASH MPD server 32.

Figure 2:
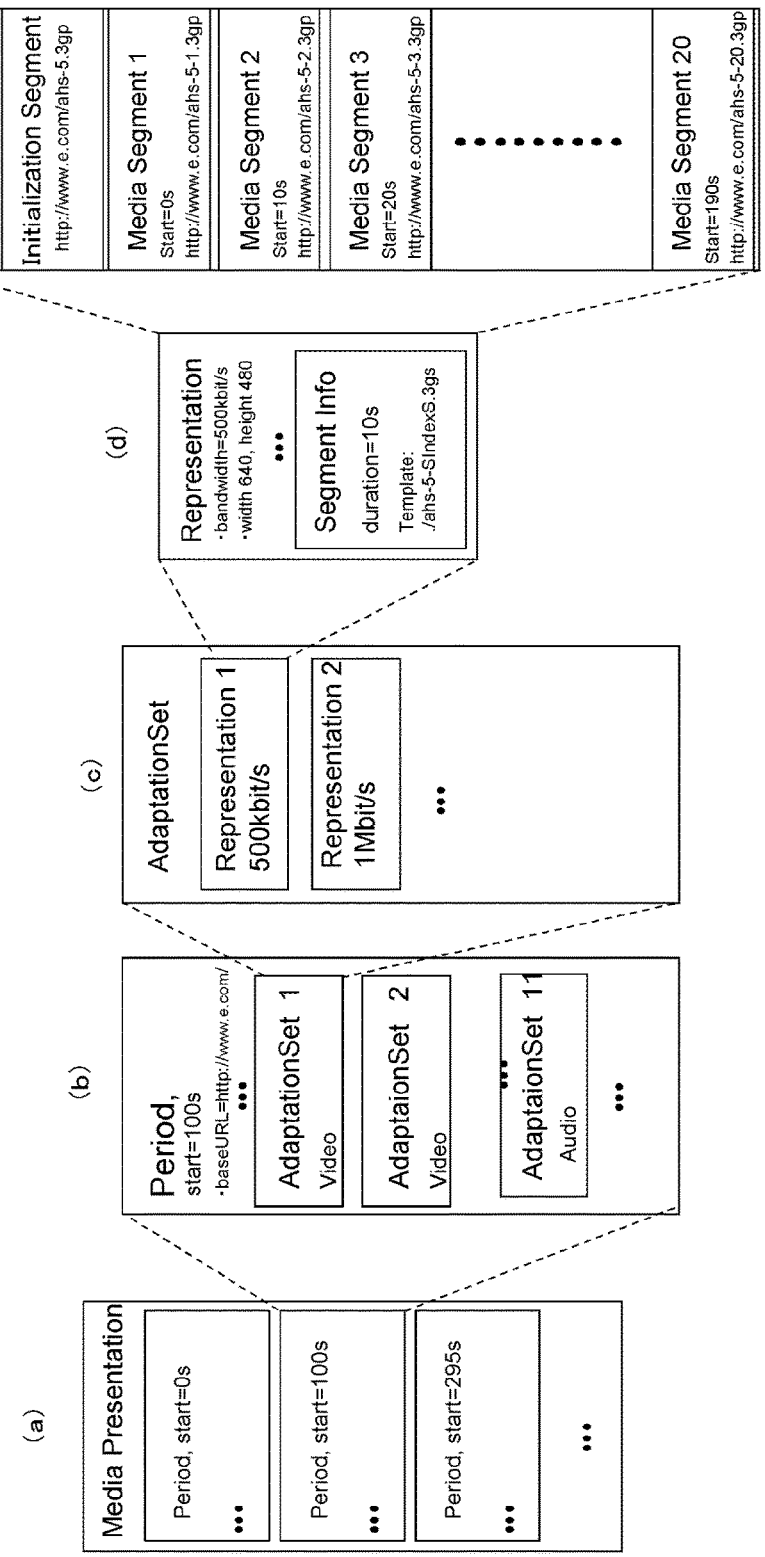
FIGS. 2(a) to 2(e) are diagrams illustrating an example of a relationship between each of structures hierarchically arranged in an MPD file.

FIGS. 2(a) to 2(e) illustrate an example of a relationship between each of structures hierarchically arranged in the MPD file. As illustrated in FIG. 2(a), there exists a plurality of periods (Period) divided by time intervals in a media presentation (Media Presentation) as a whole MPD file. For example, the first period starts from 0 seconds, the next period starts from 100 seconds, and the like.

As illustrated in FIG. 2(b), there exists a plurality of adaptation sets (AdaptationSet) in the period. Each adaptation set depends on differences in media types such as videos and audio and differences in languages, viewpoints, and the like in the same media type. As illustrated in FIG. 2(c), there exists a plurality of representations (Representation) in the adaptation set. Each representation depends on stream attributes, for example, differences in rates.

As illustrated in FIG. 2(d), the representation includes segment info (SegmentInfo). As illustrated in FIG. 2(e), there exist an initialization segment (Initialization Segment) and a plurality of media segments (Media Segment) in this segment info. Information for each of the segments (Segment) into which the period is further finely divided is described in the media segments (Media Segment). In the media segments, there exist address (url) information and the like to actually obtain segment data such as videos and audio.

Note that streams can be freely switched between the plurality of representations included in the adaptation set. This configuration allows selection of a stream with an optimum rate according to the condition of the network environment on the reception side, enabling seamless video distribution.

[Exemplary Configuration of the Transmission and Reception System]

Figure 3:
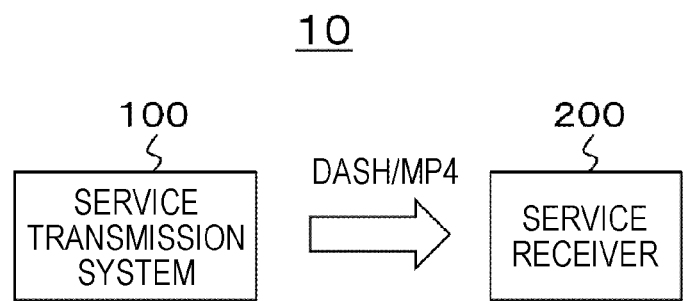
FIG. 3 is a block diagram illustrating an exemplary configuration of a transmission and reception system as an embodiment.

FIG. 3 illustrates an exemplary configuration of a transmission and reception system 10 as an embodiment. This transmission and reception system 10 includes a service transmission system 100 and a service receiver 200. The service transmission system 100 in this transmission and reception system 10 corresponds to the DASH stream file server 31 and the DASH MPD server 32 in the stream distribution system 30A illustrated in FIG. 1(a) described above. Furthermore, the service transmission system 100 in this transmission and reception system 10 corresponds to the DASH stream file server 31, the DASH MPD server 32, and the broadcast transmission system 36 in the stream distribution system 30B illustrated in FIG. 1(b) described above.

Furthermore, the service receiver 200 in this transmission and reception system 10 corresponds to the service receiver 33 (33-1, 33-2, . . . , and 33-N) in the stream distribution system 30A illustrated in FIG. 1(a) described above. Furthermore, the service receiver 200 in this transmission and reception system 10 corresponds to the service receiver 35 (35-1, 35-2, . . . , and 35-M) in the stream distribution system 30B illustrated in FIG. 1(b) described above.

The service transmission system 100 transmits DASH/MP4, that is, an MPD file as a metafile, as well as MP4 including a media stream (media segment) such as a video and audio through the communication network transmission line (see FIG. 1(a)) or the RF transmission line (see FIG. 1(b)).

"Exemplary Configuration of the Service Transmission System"

Figure 4:
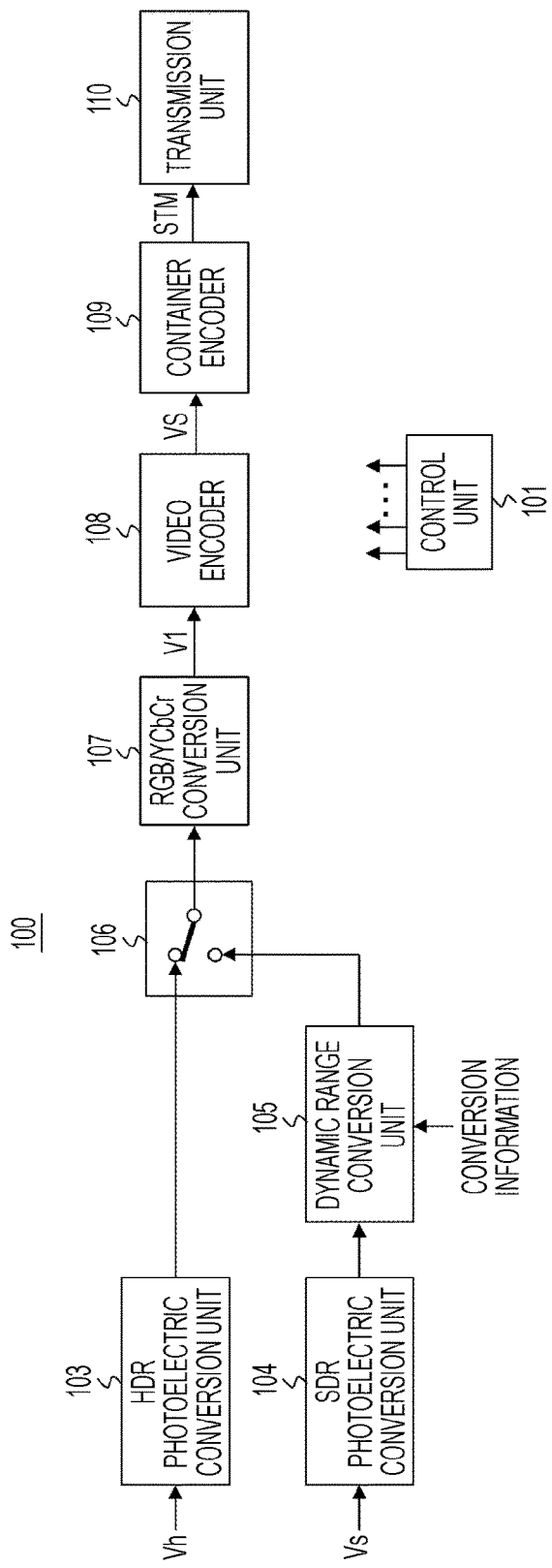
FIG. 4 is a block diagram illustrating an exemplary configuration of a service transmission system.

FIG. 4 illustrates an exemplary configuration of the service transmission system 100. This service transmission system 100 includes a control unit 101, an HDR photoelectric conversion unit 103, an SDR photoelectric conversion unit 104, a dynamic range conversion unit 105, a changeover switch 106, an RGB/YCbCr conversion unit 107, a video encoder 108, a container encoder 109, and a transmission unit 110.

The control unit 101 includes a central processing unit (CPU), and controls the operation of each unit of the service transmission system 100 on the basis of a control program. The HDR photoelectric conversion unit 103 performs photoelectric conversion by applying an HDR photoelectric conversion characteristic to a high contrast camera output, that is, high dynamic range (HDR) video data Vh, and obtains HDR transmission video data. This HDR transmission video data becomes a video material produced as a video by an HDR OETF.

The SDR photoelectric conversion unit 104 performs photoelectric conversion by applying an SDR photoelectric conversion characteristic to a standard contrast camera output, that is, standard dynamic range (SDR) video data Vs, and obtains SDR transmission video data. This SDR transmission video data becomes a video material produced as a video by an SDR OETF.

The dynamic range conversion unit 105 obtains HDR transmission video data by performing dynamic range conversion on the SDR transmission video data. That is, this dynamic range conversion unit 105 converts the SDR transmission video data, which is the video material produced as the video by the SDR OETF, into the HDR transmission video data. Here, the dynamic range conversion unit 105 performs the dynamic range conversion on the basis of conversion information. The conversion information is for converting a value of conversion data in accordance with the SDR photoelectric conversion characteristic into a value of conversion data in accordance with the HDR photoelectric conversion characteristic. This conversion information is given, for example, by the control unit 101.

The dynamic range conversion will be further described with reference to FIG. 5. A solid line a indicates an example of an SDR OETF curve indicating the SDR photoelectric conversion characteristic. A solid line b indicates an example of an HDR OETF curve indicating the HDR photoelectric conversion characteristic. The horizontal axis indicates an input luminance level. P1 indicates an input luminance level corresponding to the SDR maximum level. P2 indicates an input luminance level corresponding to the HDR maximum level.

Furthermore, the vertical axis indicates a transmission code value or a relative value of a normalized encoding level. A relative maximum level M indicates the HDR maximum level and the SDR maximum level. A reference level G indicates a transmission level of the HDR OETF at the input luminance level P1 corresponding to the SDR maximum level, which means a so-called white level as a reference. It is indicated that the range higher than this level is used for sparkling expression which is unique to HDR. A branch level B indicates a level at which the SDR OETF curve and the HDR OETF curve branch and separate from the same locus. Pf indicates an input luminance level corresponding to the branch level. Note that this branch level B can be any value equal to or greater than 0.

The SDR transmission video data from the branch level B to the relative maximum level M is converted into a value of the conversion data in accordance with the HDR photoelectric conversion characteristic through the dynamic range conversion performed by the dynamic range conversion unit 105. In this case, the relative maximum level M which is the SDR maximum level is made to match the reference level G. Note that the input data less than the branch level B becomes output data as it is.

Here, the conversion information is given by a conversion table or a conversion coefficient. In a case where the conversion information is given by the conversion table, the dynamic range conversion unit 105 performs the conversion by referring to this conversion table. In contrast, in a case where the conversion information is given by the conversion coefficient, the dynamic range conversion unit 105 performs the conversion by making a calculation using this conversion coefficient. For example, in a case where the conversion coefficient is C, the input data from the branch level B to the relative maximum level M is converted using the following equation (1).

$$\text{Output data}=\text{branch level } B+(\text{input data}-\text{branch level } B)*C \quad (1)$$

Referring back to FIG. 4, the changeover switch 106 selectively takes out the HDR transmission video data obtained by the HDR photoelectric conversion unit 103 or the HDR transmission video data obtained by the dynamic range conversion unit 105. The RGB/YCbCr conversion unit 107 converts the HDR transmission video data taken out by the changeover switch 106 from an RGB domain to a YCbCr (luminance and chrominance) domain. In this case, the RGB/YCbCr conversion unit 107 performs the conversion using a conversion equation corresponding to a color space on the basis of color space information. Note that these color space domains are not limited to the RGB domain, and the luminance and chrominance domain is not limited to YCbCr.

The video encoder 108 performs encoding, for example, MPEG4-AVC or HEVC on HDR transmission video data V1 which has been converted into the YCbCr domain by the RGB/YCbCr conversion unit 107, and obtains encoded video data. The video encoder 108 then generates a video stream (video elementary stream) VS including this encoded video data.

At this time, the video encoder 108 inserts meta-information into a video usability information (VUI) area of an SPS NAL unit of an access unit (AU). The meta-information indicates that the stream is an HDR stream, and furthermore, an HDR electro-optical conversion characteristic and the like. Furthermore, the video encoder 108 inserts a newly defined dynamic range conversion SEI message (Dynamic_range_conn SEI message) into "SETs" part of the access unit (AU). The dynamic range conversion SEI message includes the conversion information on the dynamic range conversion described above.

FIG. 6 illustrates an access unit located at the head of a group of pictures (GOP) in a case where an encoding method is HEVC. In the case of the HEVC encoding method, an SEI message group "Prefix_SEIs" for decoding is arranged before a slice (slices) where pixel data is encoded, and an SEI message group "Suffix_SEIs" for display is arranged after this slice (slices). As illustrated in the figure, the dynamic range conversion SEI message is arranged as, for example, the SEI message group "Suffix_SEIs".

FIG. 7 illustrates an exemplary structure (Syntax) of the dynamic range conversion SEI message. FIG. 8 illustrates contents (Semantics) of the main information in the exemplary structure. One-bit flag information of "Dynamic_range_conv_cancel_flag" indicates whether a message of "Dynamic_range_conv" is refreshed. "0" indicates that the message of "Dynamic_range_conv" is refreshed. "1" indicates that the message of "Dynamic_range_conv" is not refreshed. That is, the previous message is maintained as it is.

In a case where "Dynamic_range_conv_cancel_flag" is "0", the following fields exist. An 8-bit field of "coded_data_bit_depth" indicates a bit depth of encoded pixels (bit depth of the transmission code value). A 14-bit field of "reference_level" indicates a reference luminance level value, that is, the reference level G (see FIG. 5). One-bit flag information of "ratio_conversion_flag" indicates that a simple conversion is performed, that is, indicating that there exists a conversion coefficient. One-bit flag information of "conversion_table_flag" indicates that a conversion table is used, that is, indicating that there exists conversion table information. A 16-bit field of "branch_level" indicates the branch level B (see FIG. 5).

In a case where "ratio_conversion_flag" is "1", an 8-bit field of "level_conversion_ratio" exists. This field indicates the conversion coefficient (ratio of level conversion). In a case where "conversion_table_flag" is "1", an 8-bit field of "table_size" exists. This field indicates the number of inputs in the conversion table. Then, "level_R[i]", "level_G[i]", and "level_B[i]" having 16-bit field each exists for the number of inputs. The "level_R[i]" field indicates a value after conversion of a red component (Red component). The "level_G[i]" field indicates a value after conversion of a green component (Red component). The "level_B[i]" field indicates a value after conversion of a blue component (Red component).

Note that in a case where the bit depth of the encoded pixels is 8 bits, values corresponding to respective values of the input data exist. However, in a case where the bit depth of the encoded pixels is 10 bits, 12 bits or the like, only values corresponding to respective values of high-order 8 bits of the input data exist. In this case, when the conversion table is used on the reception side, interpolated values are used for values of the remaining low-order bits.

Referring back to FIGS. 1(a) and 1(b), the container encoder 109 generates a container, here MP4, as a distribution stream STM. The container includes a video stream VS generated by the video encoder 108. Description will be given on a media file entity at a location destination indicated by "<baseURL>" for a non-fragmented MP4 (Non-Fragmented MP4) case (VOD service).

Figure 9:
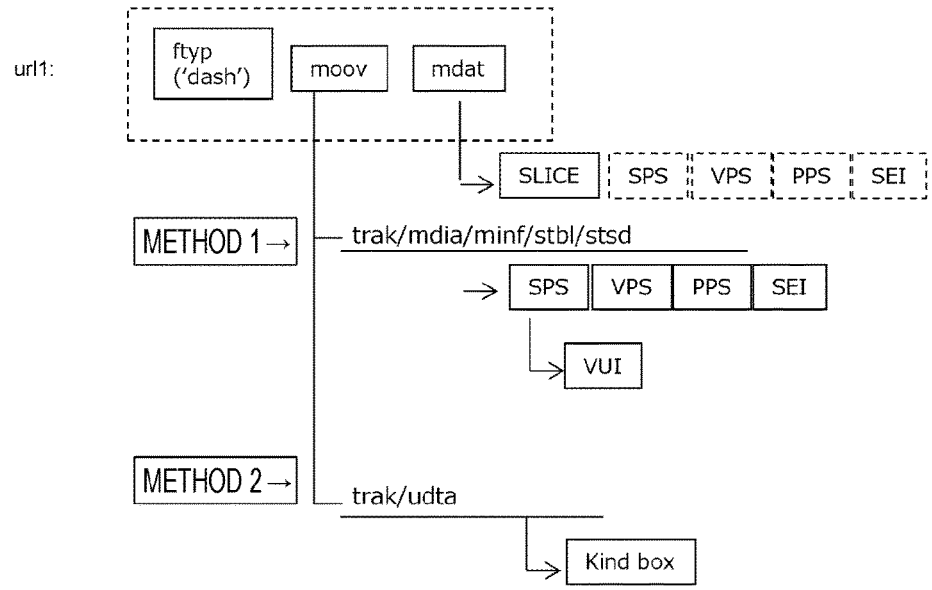
FIG. 9 is a diagram for describing a media file entity for a non-fragmented MP4 (Non-Fragmented MP4) case (VOD service).

In this case, it may be defined as "url 1" as illustrated in FIG. 9. In this case, an "ftyp" box is arranged first. The "ftyp" is where a file type is described. Indicated by this "ftyp" box is a non-fragmented MP4 file. Subsequently, a "moov" box and an "mdat" box are arranged. The "moov" box includes all the metadata, for example, header information of a track, meta description of contents of the content, and time information. In the "mdat" box, a SLICE NAL unit is arranged. The SLICE NAL unit is the media data body. Note that each NAL unit of an SPS, a VPS, a PPS, and an SEI can also be arranged in this "mdat" box.

Furthermore, each NAL unit of the SPS, the VPS, the PPS, and the SEI is arranged in an "stsd" box under the "moov" box (method 1). Meta-information of a video usability information (VUI) area of the SPS NAL unit indicates, for example, that the stream is an HDR stream. Furthermore, there also exists a NAL unit of the above-described dynamic range conversion SEI message as an SEI NAL unit. Note that elements defined by a "kind" box in the "udta" box under the "moov" box may be used to indicate, for example, that the stream is an HDR stream (method 2).

Furthermore, description will be given on a media file entity at a location destination indicated by "<baseURL>" for a fragmented MP4 (Fragmented MP4) case (multicast service).

Figure 10:
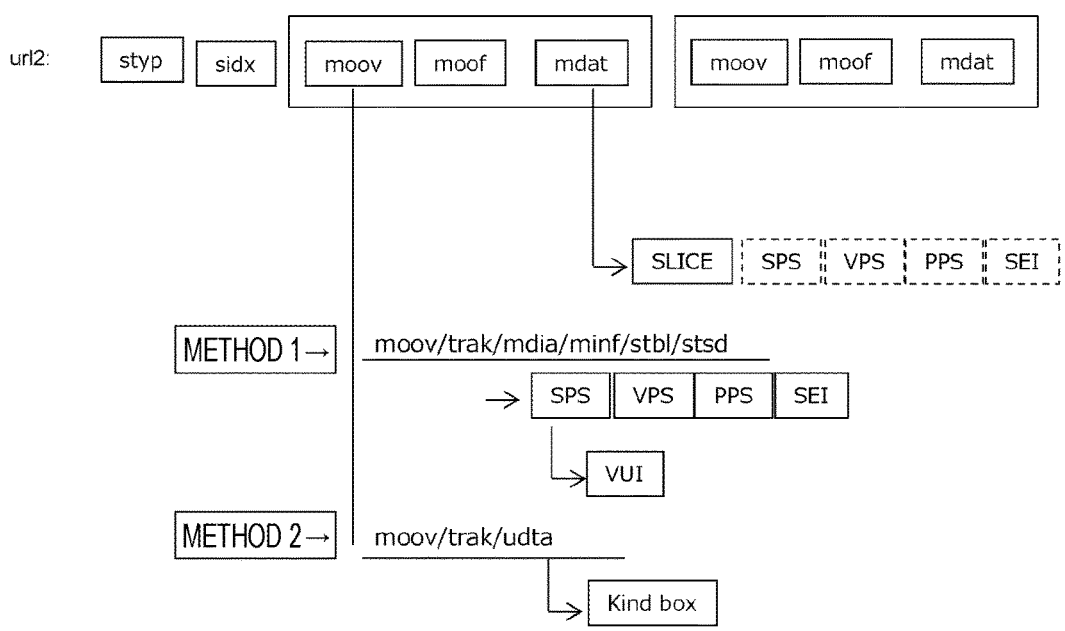
FIG. 10 is a diagram for describing a media file entity for a fragmented MP4 (Fragmented MP4) case (multicast service).

In this case, it may be defined as "url 2" as illustrated in FIG. 10. In this case, an "styp" box is arranged first. The "styp" box is where a file type is described. Subsequently, a "sidx" box is arranged. The "sidx" box is where a segment index is described. After that, a predetermined number of movie fragments (Movie Fragment) are arranged.

Each movie fragment includes a "moon" box, a "moof" box, and an "mdat" box. The "moof" includes fragment control information. The "mdat" box includes media data body. The multicast service has to be subjected to random access. To cope with the random access, it is necessary to arrange the "moon" box in each movie fragment. This configuration will be similarly applied to the broadcasting case described later. In the "mdat" box, a SLICE NAL unit is arranged. The SLICE NAL unit is the media data body. Note that each NAL unit of an SPS, a VPS, a PPS, and an SEI can also be arranged in this "mdat" box.

Furthermore, each NAL unit of the SPS, the VPS, the PPS, and the SEI is arranged in an "stsd" box under the "moon" box (method 1). Meta-information of a video usability information (VUI) area of the SPS NAL unit indicates, for example, that the stream is an HDR stream. Furthermore, there also exists a NAL unit of the above-described dynamic range conversion SEI message as an SEI NAL unit. Note that elements defined by a "kind" box in the "udta" box under the "moov" box may be used to indicate, for example, that the stream is an HDR stream (method 2).

Furthermore, description will be given on a media file entity for a fragmented MP4 (Fragmented MP4) case (broadcasting). In this case, an "styp" box is arranged first as illustrated in FIG. 11. The "styp" box is where a file type is described. Subsequently, a "sidx" box is arranged. The "sidx" box is where a segment index is described. After that, a predetermined number of combinations of an "MPD" box and a movie fragment (Movie Fragment) are arranged.

An MPD file is arranged in the "MPD" box. Each movie fragment includes a "moov" box, a "moof" box, and an "mdat" box. The "moof" includes fragment control information. The "mdat" box includes media data body. In the "mdat" box, a SLICE NAL unit is arranged. The SLICE NAL unit is the media data body. Note that each NAL unit of an SPS, a VPS, a PPS, and an SEI can also be arranged in this "mdat" box.

Furthermore, each NAL unit of the SPS, the VPS, the PPS, and the SEI is arranged in an "stsd" box under the "moov" box (method 1). Meta-information of a video usability information (VUI) area of the SPS NAL unit indicates, for example, that the stream is an HDR stream.

Furthermore, there also exists a NAL unit of the above-described dynamic range conversion SEI message as an SEI NAL unit. Note that elements defined by a "kind" box in the "udta" box under the "moov" box may be used to indicate, for example, that the stream is an HDR stream (method 2).

Note that the MPD file can be considered to include the meta-information in the above-described VUI area, dynamic conversion information, and the like. In the MPD file, "schemeIdUri" can be newly defined as broadcasting or any other applications by "SupplementaryDescriptor", separately from an existing definition in the conventional standard.

FIG. 12 illustrates an exemplary description of the MPD file. Although the example illustrated herein describes only information on video streams to simplify the description, information on media streams other than the video streams is also described in practice. FIG. 13 illustrates "Value" semantics of "SupplementaryDescriptor".

The description of "<AdaptationSet mimeType="video/mp4"group="1">" indicates that there exists an adaptation set (AdaptationSet) for a video stream, the video stream is supplied with an MP4 file structure, and a group 1 is allocated. The description of "<SupplementaryDescriptor schemeIdUri="urn:brdcst:codecType"value="hevc"/> indicates that the codec of the video stream is "HEVC".

The description of <SupplementaryDesctiptor schemeidUri="urn:brdcst:video:highdynamicrange" value="HDR"/>indicates that the current stream is an HDR stream. Note that "1" may be described instead of "HDR" to indicate that the current stream is an HDR stream. Furthermore, "SDR" or "0" is described to indicate that the current stream is an HDR stream.

The description of <SupplementaryDesctiptor schemeIdUri="urn:brdcst:video: transferfunction"value="EOTFtype"/> indicates an electro-optical conversion characteristic (EOTF characteristic). For example, in the case of "BT.709-5 Transfer Function", "bt709" or "1" is described in the "EOTFtype" part. Furthermore, for example, in the case of "10 bit BT.2020 Transfer Function", "bt2020" or "14" is described in the "EOTFtype" part. Furthermore, for example, in the case of "SMPTE 2084 Transfer Function", "st2028" or "16" is described in the "EOTFtype" part.

The description of <SupplementaryDesctiptor schemeidUri="urn:brdcst:video: xycolourprimaries"value="ColorGamut"/> indicates a color space. For example, in the case of "BT.709-5", "bt709" or "1" is described in the "ColorGamut" part. Furthermore, for example, in the case of "BT.2020", "bt2020" or "9" is described in the "ColorGamut" part. Furthermore, for example, in the case of "SMPTE 428 or XYZ", "st428" or "10" is described in the "ColorGamut" part.

The description of <SupplementaryDesctiptor schemeIdUri="urn:brdcst:video:matrixcoefficients" value="ColorMatrix"/> indicates a color matrix coefficient. For example, in the case of "BT.709-5", "bt709" or "1" is described in the "ColorMatrix" part. Furthermore, for example, in the case of "BT.2020 non-constant lumiinance", "bt2020n" or "9" is described in the "ColorMatrix" part. Furthermore, for example, in the case of "SMPTE 2085 or Y'D'zD'x", "st2085" or "11" is described in the "ColorMatrix" part.

Figure 5:
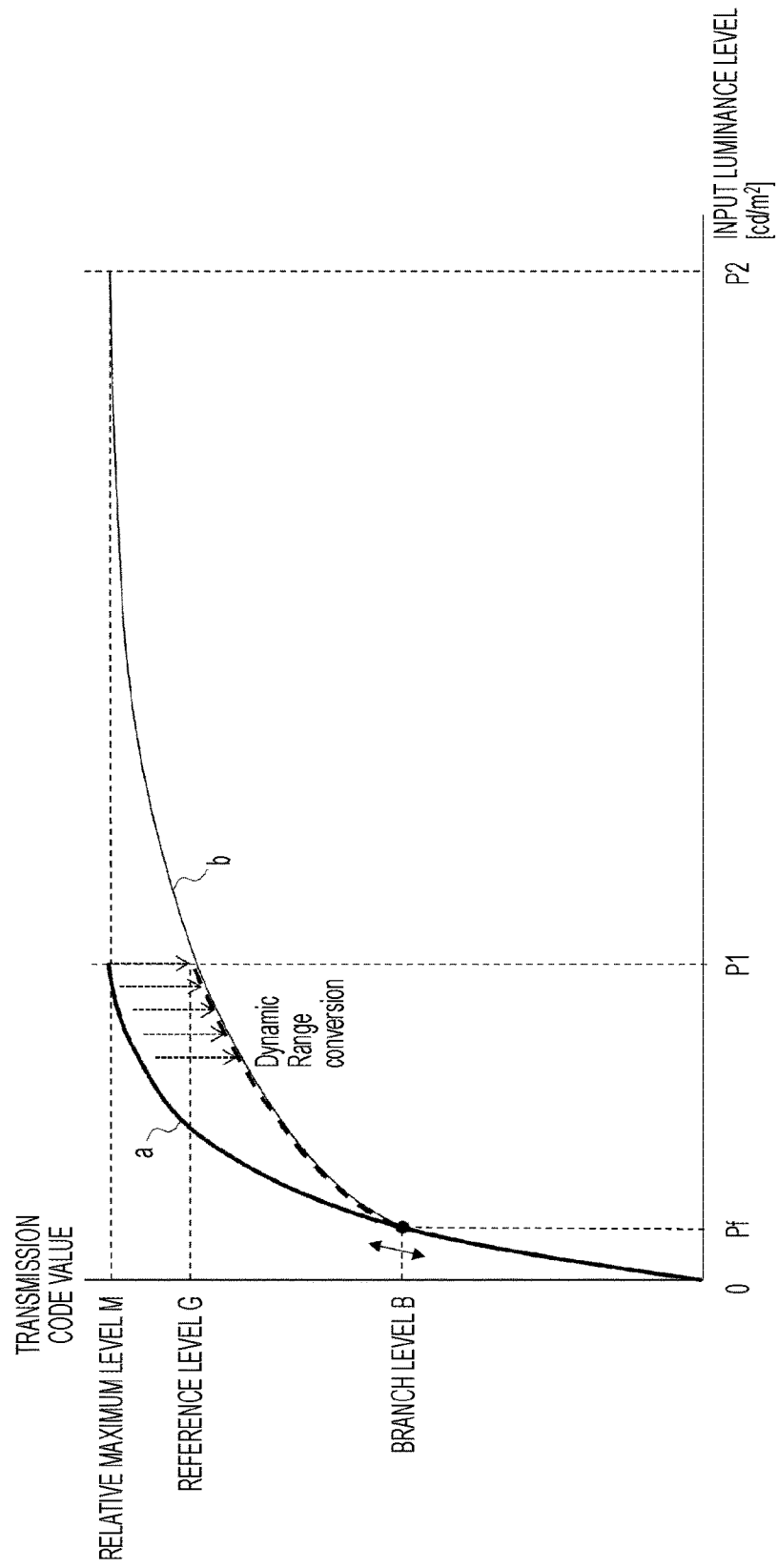
FIG. 5 is a diagram for describing an operation of a dynamic range conversion unit in the service transmission system.

The description of <SupplementaryDesctiptor schemeIdUri="urn:brdcst:video:referencelevel" value="RefLevel"/> indicates the reference level G (see FIG. 5). A reference level specified with a value of 0 to 100 in a relative range normalized to "1" at maximum is described in the "RefLevel" part. A value obtained by dividing this value by 100 is recognized as a relative reference level on the reception side. This relative reference level constitutes a conversion coefficient as conversion information for the dynamic range conversion.

The description of <SupplementaryDesctiptor schemeIdUri="urn:brdcst:video:branchlevel" value="BranchLevel"/> indicates the branch level B (see FIG. 5). A branch level specified with a value of 0 to 100 in a relative range normalized to "1" at maximum is described in the "BranchLevel" part. A value obtained by dividing this value by 100 is recognized as a relative reference level on the reception side.

The description of <SupplementaryDesctiptor schemeIdUri="urn:brdcst:video:streamdependency" value="DependType"/> indicates whether the current stream is an independent stream. In the case of an independent stream, "base" or "0" is described in the "DependType" part. In the case of a dependent stream, "extended" or "1" is described in the "DependType" part.

The description of <SupplementaryDesctiptor schemeIdUri="urn:brdcst:video:originaldynamicrange" value="DrangeType"/> indicates whether original video data of the current stream is SDR video data. In the case of SDR video data, "sdr" is described in the "DrangeType" part. In the case of HDR video data, "hdr" is described in the "DrangeType" part.

The description of "<Representation id="1" bandwidth="20000000">" indicates that there exists a video stream with a bit rate of 20 Mbps, which includes encoded data of group "group1 " as a representation identified by "Representation id="1"" in the adaptation set of the group 1. Then, the description of "<baseURL>video/jp/20000000.mp4</BaseURL>" indicates that a location destination of the video stream is "video/jp/20000000.mp4".

The exemplary description of the MPD file in FIG. 12 is an example in a case where a dependent stream exists. The description of "<AdaptationSet mimeType="video/mp4" group="2">" indicates that there exists an adaptation set (AdaptationSet) for a video stream, the video stream is supplied with the MP4 file structure, and a group 2 is allocated. Although detailed description is omitted, information similar to that of the video stream of the group 1 described above is also described for the video stream of the group 2.

Note that the elements defined by the "kind" box in the "udta" box under the "moon" box described above can be, for example, the elements enclosed by a broken line frame in FIG. 12.

Referring back to FIG. 4, the transmission unit 110 transmits the MP4 distribution stream STM, which has been obtained by the container encoder 109, to the service receiver 200 on a broadcast wave or in a network packet.

The operation of the service transmission system 100 illustrated in FIG. 4 will be briefly described. HDR video data Vh, which is a high contrast camera output, is supplied to the HDR photoelectric conversion unit 103. In this HDR photoelectric conversion unit 103, photoelectric conversion is performed on the HDR video data Vh on the basis of an HDR photoelectric conversion characteristic, and HDR transmission video data is obtained as a video material produced as a video by an HDR OETF.

Furthermore, SDR video data Vs, which is a standard contrast camera output, is supplied to the SDR photoelectric conversion unit 104. In this SDR photoelectric conversion unit 104, photoelectric conversion is performed on the SDR video data Vs on the basis of an SDR photoelectric conversion characteristic, and SDR transmission video data is obtained as a video material produced as a video by an SDR OETF.

The SDR transmission video data obtained in the SDR photoelectric conversion unit 104 is supplied to the dynamic range conversion unit 105. In the dynamic range conversion unit 105, dynamic range conversion is performed on the SDR transmission video data on the basis of conversion information (conversion table, conversion coefficient) supplied from the control unit 101. The SDR transmission video data is converted into the HDR transmission video data through this dynamic range conversion (see FIG. 5).

In the changeover switch 106, the HDR transmission video data obtained in the HDR photoelectric conversion unit 103 or the HDR transmission video data obtained in the dynamic range conversion unit 105 is selectively taken out under control of the control unit 101. The HDR transmission video data taken out in this way is converted from the RGB domain to the YCbCr (luminance and chrominance) domain in the RGB/YCbCr conversion unit 107.

The HDR transmission video data V1 converted into the YCbCr domain is supplied to the video encoder 108. In this video encoder 108, encoding, for example, MPEG4-AVC or HEVC is performed on the HDR transmission video data V1 to obtain encoded video data, through which a video stream VS including this encoded video data is generated.

In the video encoder 108, at this time, meta-information is inserted into a video usability information (VUI) area of an SPS NAL unit of an access unit (AU). The meta-information indicates that the stream is an HDR stream, and furthermore, an HDR electro-optical conversion characteristic, and the like. In the video encoder 108, furthermore, a newly defined dynamic range conversion SEI message is inserted into an "SEIs" part of the access unit (AU). The dynamic range conversion SEI message includes the conversion information (conversion cable, conversion coefficient) on the dynamic range conversion (see FIG. 7).

The video stream VS obtained in the video encoder 108 is supplied to the container encoder 109. In the container encoder 109, MP4 that is a container including the video stream VS is generated as a distribution stream STM. At this time, meta-information is inserted into MP4, for example, under the "moon" box. The meta-information indicates, for example, that the stream is an HDR stream.

This distribution stream STM is transmitted by the transmission unit 110 to the service receiver 200 on a broadcast wave or in a network packet.

"Exemplary Configuration of the Service Receiver"

Figure 14:
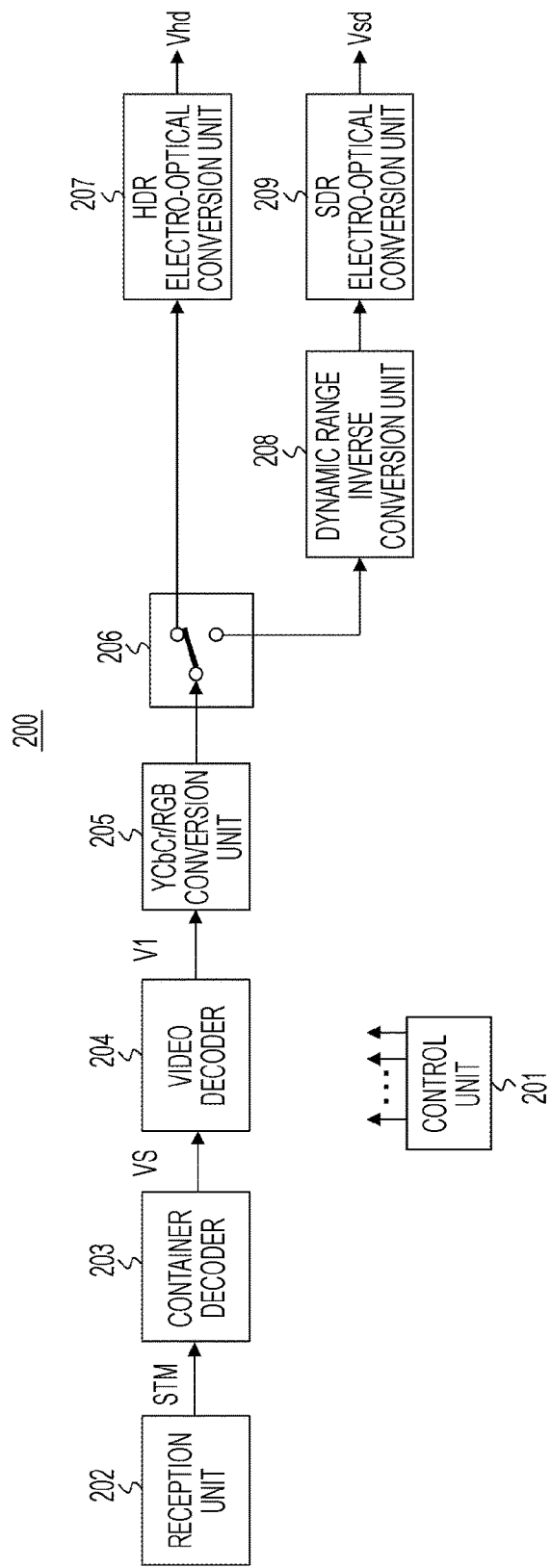
FIG. 14 is a block section illustrating an exemplary configuration of a service receiver.

FIG. 14 illustrates an exemplary configuration of the service receiver 200. This service receiver 200 includes a control unit 201, a reception unit 202, a container decoder 203, a video decoder 204, a YCbCr/RGB conversion unit 205, a changeover switch 206, an HDR electro-optical conversion unit 207, a dynamic range inverse conversion unit 208, and an SDR electro-optical conversion unit 209.

The control unit 201 includes a central processing unit (CPU), and controls the operation of each unit of the service receiver 200 on the basis of a control program. The reception unit 202 receives an MP4 distribution stream STM transmitted from the service transmission system 100 on a broadcast wave or in a network packet. The container decoder 203 extracts a video stream VS from the MP4. Furthermore, the container decoder 203 extracts meta-information from the MP4 and transmits the meta-information to the control unit 201. The control unit 201 recognizes from this meta-information that the stream is an HDR stream, as well as HDR electro-optical conversion characteristic information, original video data information, and the like.

The video decoder 204 performs decoding processing on the video stream VS extracted by the container decoder 203, and obtains HDR transmission video data V1. Furthermore, parameter sets and an SEI message inserted into each access unit constituting the video stream VS are extracted and transmitted to the control unit 201 by the video decoder 204.

The control unit 201 recognizes from the meta-information in a VUI area of an SPS NAL unit that the stream is an HDR stream, as well as the HDR electro-optical conversion characteristic information, and the like. Furthermore, the control unit 201 recognizes dynamic range conversion information (conversion table, conversion coefficient) from a dynamic range conversion SEI message.

The YCbCr/RGB conversion unit 205 converts the HDR transmission video data V1, which has been obtained by the video decoder 204, from the YCbCr (luminance and chrominance) domain to the RGB domain. The changeover switch 206 transmits the HDR transmission video data V1, which has been converted into the RGB domain, to the HDR electro-optical conversion unit 207 or the dynamic range inverse conversion unit 208 under control of the control unit 201.

In this case, in a case where a display monitor (not illustrated) supports HDR, the changeover switch 206 transmits the HDR transmission video data to the HDR electro-optical conversion unit 207. On the other hand, in a case where a display monitor supports SDR, the changeover switch 206 transmits the HDR transmission video data to the dynamic range inverse conversion unit 208.

The control unit 201 sets the HDR electro-optical conversion characteristic in the HDR photoelectric conversion unit 207. The HDR electro-optical conversion characteristic is the one recognized from the meta-information, that is, the HDR electro-optical conversion characteristic corresponding to an HDR photoelectric conversion characteristic used on the transmission side. The HDR photoelectric conversion unit 207 obtains display video data Vhd for displaying an HDR image by applying the HDR electro-optical conversion characteristic to the HDR transmission video data V1 taken out by the changeover switch 206.

The control unit 201 gives the dynamic range inverse conversion unit 208, for example, the dynamic range conversion information (conversion table, conversion coefficient) recognized from the dynamic range conversion SEI message. The dynamic range inverse conversion unit 208 performs, on the basis of this conversion information, dynamic range inverse conversion on the HDR transmission video data V1 which has been taken out by the changeover switch 206, and obtains SDR transmission video data.

Figure 15:
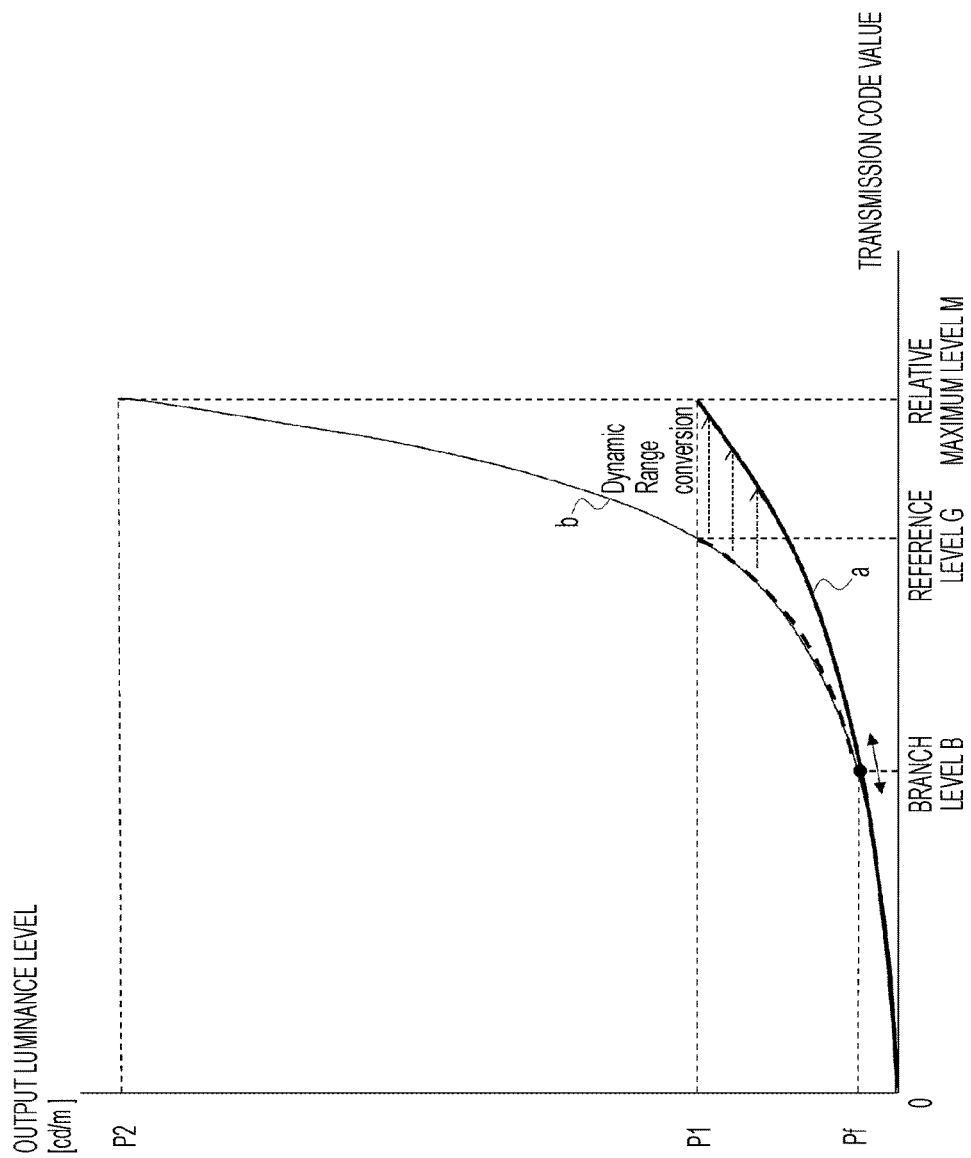
FIG. 15 is a diagram for describing details of dynamic range inverse conversion in a case where original video data of a current stream is SDR video data.

The details of the dynamic range inverse conversion will be described with reference to FIG. 15. This is a case where original video data of the current stream is SDR video data. The vertical axis indicates an output luminance level, which corresponds to the horizontal axis in FIG. 5. Furthermore, the horizontal axis indicates a transmission code value, which corresponds to the vertical axis in FIG. 5. A solid line a is an SDR EOTF curve indicating an SDR electro-optical conversion characteristic. This SDR EOTF curve corresponds to the SDR OETF curve indicated by the solid line a in FIG. 5. A solid line b is an HDR EOTF curve indicating an HDR electro-optical conversion characteristic. This HDR EOTF curve corresponds to the HDR OETF curve indicated by the solid line b in FIG. 5.

The HDR transmission video data from the branch level B to the reference level G is converted so as to match a value of the conversion data in accordance with the SDR photoelectric conversion characteristic in the dynamic range inverse conversion performed by the dynamic range inverse conversion unit 208. In this case, the reference level G is made to match the relative maximum level M which is the SDR maximum level. Note that the input data less than the branch level B becomes output data as it is.

Here, the conversion information is given by the conversion table or the conversion coefficient as described above. In a case where the conversion information is given by the conversion table, the dynamic range inverse conversion unit 208 performs the conversion by referring to this conversion table. On the other hand, in a case where the conversion information is given by the conversion coefficient, the dynamic range inverse conversion unit 208 performs the conversion by making a calculation using this conversion coefficient. For example, in a case where the conversion coefficient is C, the conversion is performed using the following equation (2) with respect to the input data from the branch level B to the reference level G.

$$\text{Output data} = \text{branch level } B + (\text{input data} - \text{branch level } B) * 1/C \quad (2)$$

Figure 16:
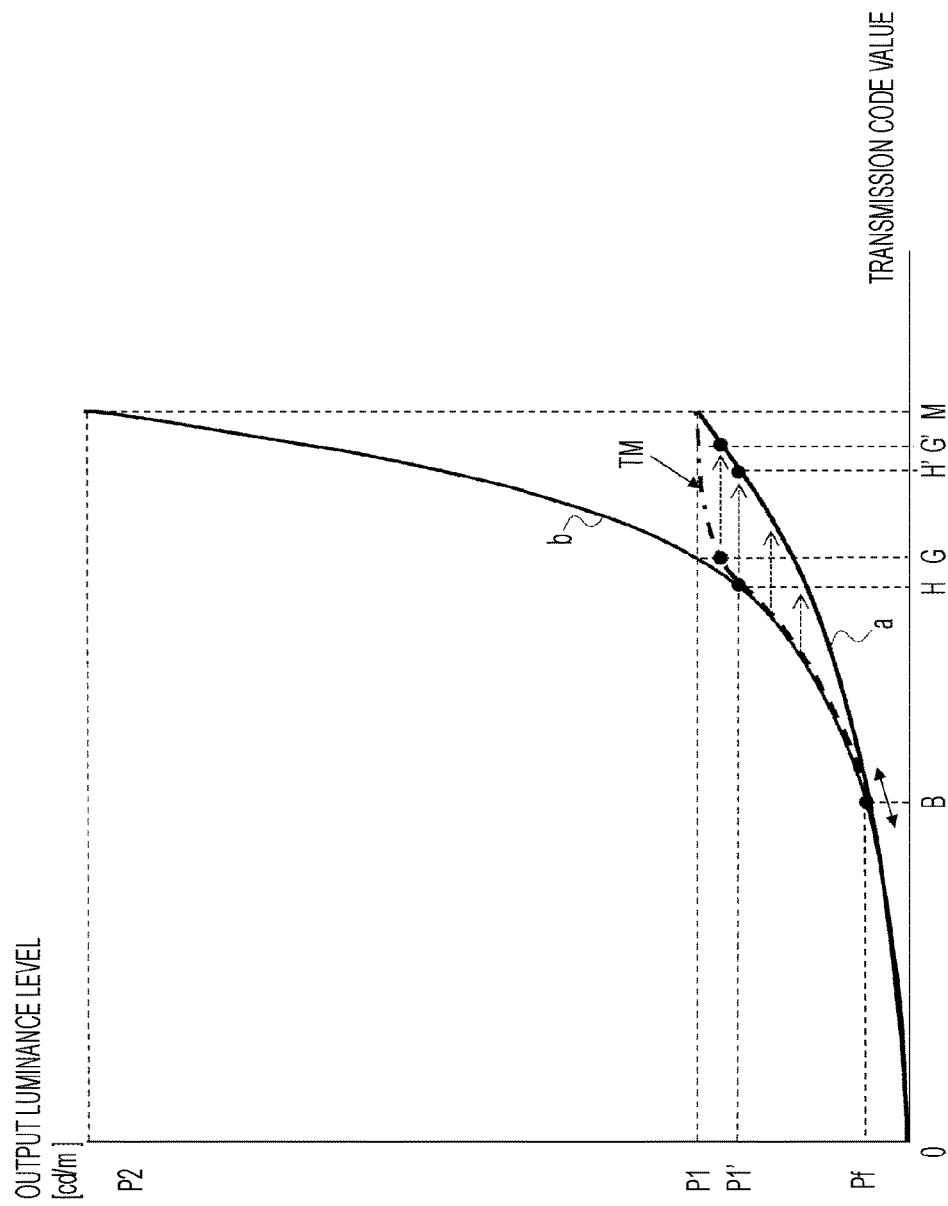
FIG. 16 is a diagram for describing details of dynamic range inverse conversion in a case where original video data of a current stream is HDR video data.

Next, the details of the dynamic range inverse conversion will be described with reference to FIG. 16. This is a case where original video data of the current stream is HDR video data. In this case, the input level to the HDR EOTF curve is converted into the input level to the SDR EOTF curve by the dynamic range inverse conversion unit 208. In FIG. 16, parts corresponding to those in FIG. 15 are denoted by the same signs. Note that P1' indicates an output luminance level corresponding to a predetermined level H lower than the reference level G.

In this case, in the dynamic range inverse conversion performed by the dynamic range inverse conversion unit 208, the input data up to the predetermined level H lower than the reference level G is converted in a similar manner to the above-described dynamic range inverse conversion which is the case where the original video data is SDR video data. Then, level conversion is performed on the input data from the level H to the level M on the basis of a tone mapping characteristic TM, through which output data is obtained. The tone mapping characteristic TM is indicated by an alternate long and short dashed line. In this case, the level H is converted into the level H', the reference level G is converted into the level G', and the level M is the level M as it is, for example.

By performing the level conversion on the input data from the level H to the level M on the basis of the tone mapping characteristic TM in this manner, it is possible to reduce deterioration in image quality due to the level saturation from the reference level G to the relative maximum level M.

The SDR electro-optical conversion unit 209 obtains display video data Vsd for displaying an SDR image by applying the SDR electro-optical conversion characteristic to the SDR transmission video data obtained by the dynamic range inverse conversion unit 208.

The operation of the service receiver 200 illustrated in FIG. 14 will be briefly described. In the reception unit 202, an MP4 distribution stream STM transmitted from the service transmission system 100 on a broadcast wave or in a network packet is received. This distribution stream STM is supplied to the container decoder 203. In the container decoder 203, a video stream VS is extracted from the MP4. In the container decoder 203, furthermore, meta-information is extracted from the MP4, and transmitted to the control unit 201. The control unit 201 recognizes from this meta-information that the stream is an HDR stream, as well as HDR electro-optical conversion characteristic information, original video data information, and the like.

The video stream VS extracted in the container decoder 203 is supplied to the video decoder 204. In the video decoder 204, decoding processing is performed on the video stream VS, through which HDR transmission video data V1 is obtained. In the video decoder 204, furthermore, parameter sets and an SEI message inserted into each access unit constituting the video stream VS are extracted and transmitted to the control unit 201.

The control unit 201 recognizes from the meta-information in a VUI area of an SPS NAL unit that the stream is an HDR stream, as well as the HDR electro-optical conversion characteristic information, and the like. Furthermore, dynamic range conversion information (conversion table, conversion coefficient) is recognized from a dynamic range conversion SEI message.

In the YCbCr/RGB conversion unit 205, the HDR transmission video data V1 obtained in the video decoder 204 is converted from the CbCr (luminance and chrominance) domain to the RGB domain. In a case where a display monitor supports HDR, the HDR transmission video data V1 converted into the RGB domain is supplied to the HDR electro-optical conversion unit 207 through the changeover switch 206.

In the HDR photoelectric conversion unit 207, the HDR electro-optical conversion characteristic is applied to the HDR transmission video data V1, through which display video data Vhd for displaying an HDR image is obtained. After display mapping processing is appropriately performed on this display video data Vhd according to the display capability of the display monitor, the display video data Vhd is supplied to the display monitor and the HDR image is displayed.

On the other hand, in a case where the display monitor supports SDR, the HDR transmission video data V1 converted into the RGB domain is supplied to the dynamic range inverse conversion unit 208 through the changeover switch 206. The dynamic range conversion information (conversion table, conversion coefficient) is given to the dynamic range inverse conversion unit 208 by the control unit 201. In the dynamic range inverse conversion unit 208, dynamic range inverse conversion is performed on the HDR transmission video data V1 on the basis of this conversion information, which is then converted into SDR transmission video data (see FIG. 15). Note that these color space domains are not limited to the RGB domain, and the luminance and chrominance domain is not limited to YCbCr.

This SDR transmission video data is supplied to the SDR electro-optical conversion unit 209. In the SDR electro-optical conversion unit 209, the SDR electro-optical conversion characteristic is applied to the SDR transmission video data, through which display video data Vsd for displaying an SDR image is obtained. After display mapping processing is appropriately performed on this display video data Vsd according to the display capability of the display monitor, the display video data Vsd is supplied to the display monitor and the SDR image is displayed.

As described above, the SDR transmission video data which is the video material produced as the video by the SDR OETF is transmitted after being converted into the HDR transmission video data in the transmission and reception system 10 illustrated in FIG. 3. Even when transmitting the SDR video data, therefore, the reception side can perform similar processing to that in the transmission of the HDR video data. This makes it possible to simplify the reception-side processing which is performed in a case where transmission of the SDR video data and transmission of the HDR video data are alternately performed.

Furthermore, the dynamic range conversion information (conversion cable, conversion coefficient) is inserted into the video stream or the container and transmitted in the transmission and reception system 10 illustrated in FIG. 3. The dynamic range conversion information is for converting the value of the conversion data in accordance with the SDR photoelectric conversion characteristic into the value of the conversion data in accordance with the HDR photoelectric conversion characteristic. The use of this conversion information, therefore, allows the reception side to easily perform processing for converting the HDR transmission video data into the SDR transmission video data and displaying the SDR image.

<2. Modification>

Note that although not described above, in a case where values of "reference_level", "branch_level", and "level_conversion ratio" that are premised in the present technology are fixedly defined on the transmission and reception sides, the service receiver 200 may be a receiver that has a function of performing a similar level conversion with respect to received data in a distribution where the values described above are guaranteed in advance even if these elements are not transmitted.

Furthermore, the embodiment described above illustrates an example in which the container is MP4. However, the present technology is not limited to MP4, and may also be similarly applicable to containers in any other formats such as MPEG-2 TS and MMT.

For example, in the case of MPEG-2 TS, a transport stream TS including a video stream VS is generated in the container encoder 109 of the service transmission system 100 illustrated in FIG. 4.

At this time, meta-information indicating, for example, that the stream is an HDR stream is inserted into the transport stream TS in the container encoder 109. For example, the container encoder 109 inserts a dynamic range conversion descriptor (Dynamic_range_conversion descriptor) under a program map table (Program Map Table (PMT)).

FIG. 17 illustrates an exemplary structure (Syntax) of the dynamic range conversion descriptor. FIG. 18 illustrates the contents (Semantics) of the main information in the exemplary structure. An 8-bit field of "descriptor_tag" indicates a descriptor type. Indicated here is a high dynamic range descriptor. An 8-bit field of "descriptor_length" indicates the length (size) of the descriptor, which indicates the number of subsequent bytes as the length of the descriptor.

An 8-bit field of "highdynamicrange" indicates whether the current stream is an HDR stream. "1" indicates an HDR stream, and "0" indicates an SDR stream. An 8-bit field of "transferfunction" indicates an electro-optical conversion characteristic (EOTF characteristic). For example, "1" indicates "BT.709-5 Transfer Function", "14" indicates "10 bit BT.2020 Transfer Function", and "16" indicates "SMPTE 2084 Transfer Function".

An 8-bit field of "xycolourprimaries" indicates a color space. For example, "1" indicates "BT.709-5", "9" indicates "BT.2020", and "10" indicates "SMPTE 428 or XYZ". An 8-bit field of "matrixcoefficients" indicates a color matrix coefficient. For example, "1" indicates "BT.709-5", "9" indicates "BT.2020 non-constant lumiinance", and "11" indicates "SMPTE 2085 or Y'D'zD'x".

An 8-bit field of "referencelevel" indicates the reference level G (see FIG. 5). In this case, a value specified with a value of 0 to 100 in a relative range normalized to "1" at maximum is described as the reference level G. A value obtained by dividing this value by 100 is recognized as a relative reference level on the reception side. This relative reference level constitutes a conversion coefficient as conversion information for the dynamic range conversion.

An 8-bit field of "branchlevel" indicates the branch level B (see FIG. 5). In this case, a value specified with a value of 0 to 100 in a relative range normalized to "1" at maximum is described as the branch level B. A value obtained by dividing this value by 100 is recognized as a branch level on the reception side.

A 4-bit field of "streamdependency" indicates whether the current stream is an independent stream. For example, "0" indicates an independent stream, and "1" indicates a dependent stream. A 4-bit field of "originaldynamicrange" indicates whether original video data of the current stream is SDR video data. For example, "0" indicates SDR video data, and "1" indicates HDR video data.

Figure 19:
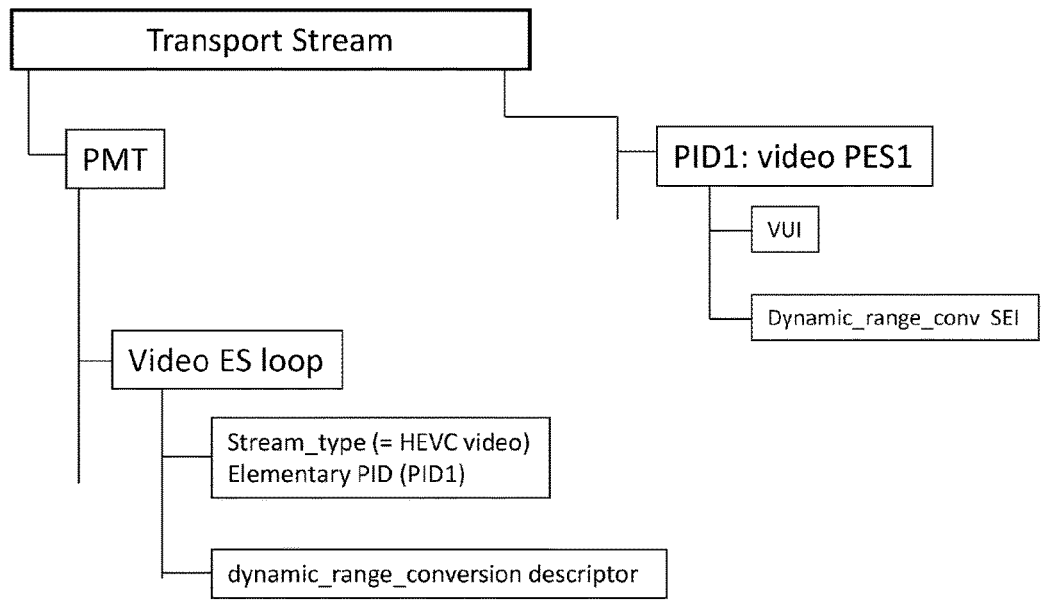
FIG. 19 is a diagram illustrating an exemplary configuration of a transport stream.

FIG. 19 illustrates an exemplary configuration of the transport stream TS. In this exemplary configuration, there exists a PES packet "video PES1" of a video stream identified by PID1. Meta-information is inserted into a VUI area of an SPS of an access unit. The meta-information indicates that the stream is an HDR stream, as well as an HDR electro-optical conversion characteristic, and the like. Furthermore, a dynamic range conversion SEI message is inserted into the access unit. Dynamic range conversion information is described in the dynamic range conversion SEI message.

Furthermore, the transport stream TS includes a program map table (PMT) as program specific information (PSI). The PSI is information describing which program each elementary stream included in the transport stream belongs to. In the PMT, there exists a program loop (Program loop) that describes information related to the entire program.

In the PMT, there exists an elementary stream loop having information related to each elementary stream. In this exemplary configuration, there exists a video elementary stream loop (video ES loop) corresponding to the video stream. Not only is information such as a stream type and a packet identifier (PID) arranged corresponding to the video stream, but also a descriptor describing information related to the video stream is arranged in the video elementary stream loop (video ES loop).

A value of "Stream_type" of this video stream is set to a value indicating, for example, an HEVC video stream. The PID information indicates PID1 added to a PES packet "video PES" of the video stream. A dynamic range conversion descriptor is inserted as one of the descriptors.

Furthermore, the present technology can also have a configuration as follows.

(1) A transmission apparatus including:

a dynamic range conversion unit configured to obtain high dynamic range transmission video data by performing dynamic range conversion on standard dynamic range transmission video data on the basis of conversion information for converting a value of conversion data in accordance with a standard dynamic range photoelectric conversion characteristic into a value of conversion data in accordance with a high dynamic range photoelectric conversion characteristic, the standard dynamic range transmission video data being obtained by performing, on standard dynamic range video data, photoelectric conversion in accordance with the standard dynamic range photoelectric conversion characteristic;

an encoding unit configured to obtain a video stream by performing encoding processing on the high dynamic range transmission video data; and a transmission unit configured to transmit a container having a predetermined format and including the video stream.

(2) The transmission apparatus according to (1) above, further including:

an information insertion unit configured to insert the conversion information into the video stream and/or the container.

(3) The transmission apparatus according to (2) above, in which the information insertion unit further inserts, into the container, information indicating that the video stream supports a high dynamic range.

(4) The transmission apparatus according to (2) or (3) above, in which the information insertion unit further inserts, into the container, information indicating a high dynamic range electro-optical conversion characteristic corresponding to the high dynamic range photoelectric conversion characteristic.

(5) The transmission apparatus according to any one of (2) to (4) above, in which the information insertion unit further inserts, into the container, information indicating that original video data is the standard dynamic range video data.

(6) The transmission apparatus according to any one of (1) to (5) above, in which the conversion information is of a conversion coefficient.

(7) The transmission apparatus according to any one of (1) to (5) above, in which the conversion information is of a conversion table.

(8) A transmission method including:

a dynamic range conversion step of obtaining high dynamic range transmission video data by performing dynamic range conversion on standard dynamic range transmission video data on the basis of conversion information for converting a value of conversion data in accordance with a standard dynamic range photoelectric conversion characteristic into a value of conversion data in accordance with a high dynamic range photoelectric conversion characteristic, the standard dynamic range transmission video data being obtained by performing, on standard dynamic range video data, photoelectric conversion in accordance with the standard dynamic range photoelectric conversion characteristic;

an encoding step of obtaining a video stream by performing encoding processing on the high dynamic range transmission video data; and a transmission step of transmitting, by a transmission unit, a container having a predetermined format and including the video stream.

(9) A reception apparatus including:

a reception unit configured to receive a container having a predetermined format and including a video stream obtained by encoding high dynamic range transmission video data;

a decoding unit configured to obtain the high dynamic range transmission video data by performing decoding processing on the video stream;

a dynamic range conversion unit configured to obtain standard dynamic range transmission video data by performing dynamic range conversion on the high dynamic range transmission video data obtained by the decoding unit; and an electro-optical conversion unit configured to obtain display standard dynamic range video data by performing, on the standard dynamic range transmission video data, electro-optical conversion in accordance with a standard dynamic range electro-optical conversion characteristic, the standard dynamic range transmission video data being obtained by the dynamic range conversion unit.

(10) The reception apparatus according to (9) above, in which the high dynamic range transmission video data obtained by the decoding unit is obtained by performing dynamic range conversion processing on the standard dynamic range transmission video data on the basis of conversion information for converting a value of conversion data in accordance with a standard dynamic range photoelectric conversion characteristic into a value of conversion data in accordance with a high dynamic range photoelectric conversion characteristic, the standard dynamic range transmission video data being obtained by performing, on standard dynamic range video data, photoelectric conversion in accordance with the standard dynamic range photoelectric conversion characteristic.

(11) The reception apparatus according to (9) or (10) above, in which conversion information is inserted into the video stream and/or the container, a conversion information extraction unit configured to extract the conversion information from the video stream and/or the container is further included, and the dynamic range conversion unit performs the dynamic range conversion on the basis of the conversion information extracted by the conversion information extraction unit.

(12) A reception method including:

a reception step of receiving, by a reception unit, a container having a predetermined format and including a video stream obtained by encoding high dynamic range transmission video data;

a decoding step of obtaining the high dynamic range transmission video data by performing decoding processing on the video stream;

a dynamic range conversion step of obtaining standard dynamic range transmission video data by performing dynamic range conversion on the high dynamic range transmission video data obtained by the decoding step; and an electro-optical conversion step of obtaining display standard dynamic range video data by performing, on the standard dynamic range transmission video data, electro-optical conversion in accordance with a standard dynamic range electro-optical conversion characteristic, the standard dynamic range transmission video data being obtained by the dynamic range conversion step.

A main feature of the present technology is to simplify reception-side processing performed in a case where transmission of SDR video data and transmission of HDR video data coexist in a time sequence. This is achieved by converting SDR transmission video data, which is a video material produced as a video by an SDR OETF, into HDR transmission video data and transmitting the HDR transmission video data (see FIGS. 4 and 5).

REFERENCE SIGNS LIST

10 Transmission and reception system
30A, 30B MPEG-DASH-based stream distribution system
31 DASH stream file server
32 DASH MPD server
33, 33-1 to 33-N Service receiver
34 CDN
35, 35-1 to 35-M Service receiver
36 Broadcast transmission system
100 Service transmission system
101 Control unit
103 HDR photoelectric conversion unit
104 SDR photoelectric conversion unit
105 Dynamic range conversion unit
106 Changeover switch
107 RGB/YCbCr conversion unit
108 Video encoder
109 Container encoder
110 Transmission unit
200 Service receiver
201 Control unit
202 Reception unit
203 Container decoder 204 Video decoder
205 YCbCr/RGB conversion unit
206 Changeover switch
207 HDR electro-optical conversion unit
208 Dynamic range inverse conversion unit
209 SDR electro-optical conversion unit

The invention claimed is:

1. A transmission apparatus comprising:
processing circuitry configured to
convert standard dynamic range (SDR) video data to SDR transmission video data by applying a SDR photoelectric conversion characteristic,
convert the SDR transmission video data to high dynamic range (HDR) transmission video data based on conversion information for converting a value of conversion data in accordance with the SDR photoelectric conversion characteristic into a value of conversion data in accordance with a HDR photoelectric conversion characteristic,
convert the HDR transmission video data from a color space domain to a luminance and chrominance domain, and
obtain a video stream by performing encoding processing on the converted HDR transmission video data; and
a transmitter configured to transmit a container having a predetermined format and including the video stream,
wherein the SDR transmission video data is converted when an input luminance level of the SDR transmission video data is greater than a first luminance threshold corresponding to a branch level and lower than a second luminance threshold corresponding to a SDR maximum level, the branch level indicating a level at which a SDR opto-electrical transfer function (OETF) curve and a HDR OETF curve separate, and
the SDR maximum level is matched to a reference level, the reference level corresponding to a transmission level of the HDR OETF curve at the second luminance threshold.

2. The transmission apparatus according to claim 1, wherein the processing circuitry is further configured to:
insert, into the container, information indicating a HDR electro-optical conversion characteristic corresponding to the HDR photoelectric conversion characteristic.

3. The transmission apparatus according to claim 1, wherein the conversion information is of a conversion coefficient.

4. The transmission apparatus according to claim 1, wherein the conversion information is of a conversion table.

5. The transmission apparatus of claim 1, wherein the conversion information is inserted into the container before and after encoded pixel data.

6. The transmission apparatus of claim 1, wherein the conversion information includes the branch level, a first value corresponding to a value after conversion of a red component, a second value corresponding to a value after conversion of a green component, and a third value corresponding to a value after conversion of a blue component.

7. The transmission apparatus according to claim 1, wherein the processing circuitry is further configured to:
insert the conversion information into the video stream and/or the container.

8. The transmission apparatus according to claim 7, wherein the processing circuitry is further configured to:
insert, into the container, information indicating that the video stream supports HDR.

9. The transmission apparatus according to claim 7, wherein the processing circuitry is further configured to:
insert, into the container, information indicating that original video data is the SDR video data.

10. The transmission apparatus of claim 1, wherein the HDR transmission video data is a function of the branch level, the SDR transmission video data, and a conversion coefficient.

11. The transmission apparatus of claim 10, wherein the dynamic range conversion includes applying:

$$\text{output data} = \text{branch level} + (\text{input data} - \text{branch level}) \times C$$

where C is the conversion coefficient, the input data corresponds to the SDR transmission video data, and the output data corresponds to the HDR transmission video data.

12. A transmission method comprising:
converting standard dynamic range (SDR) video data to SDR transmission video data by applying a SDR photoelectric conversion characteristic;
converting the SDR transmission video data to high dynamic range (HDR) transmission video data based on conversion information for converting a value of conversion data in accordance with the SDR photoelectric conversion characteristic into a value of conversion data in accordance with a HDR photoelectric conversion characteristic;
converting the HDR transmission video data from a color space domain to a luminance and chrominance domain;
obtaining a video stream by performing encoding processing on the HDR transmission video data; and
transmitting, by a transmitter, a container having a predetermined format and including the video stream,
wherein the SDR transmission video data is converted when an input luminance level of the SDR transmission video data is greater than a first luminance threshold corresponding to a branch level and lower than a second luminance threshold corresponding to a SDR maximum level, the branch level indicating a level at which a SDR opto-electrical transfer function (OETF) curve and a HDR OETF curve separate, and
the SDR maximum level is matched to a reference level, the reference level corresponding to a transmission level of the HDR OETF curve at the second luminance threshold.

13. A reception apparatus comprising:
a receiver configured to receive a container having a predetermined format and including a video stream of encoded high dynamic range (HDR) transmission video data; and
processing circuitry configured to
obtain the (HDR) transmission video data by performing decoding processing on the video stream,
obtain standard dynamic range (SDR) transmission video data by performing dynamic range conversion on the (HDR) transmission video data, and
obtain display SDR video data by performing, on the SDR transmission video data, electro-optical conversion in accordance with a SDR electro-optical conversion characteristic, wherein the HDR transmission video data is converted when a transmission code value is greater than a first threshold corresponding to a branch level and lower than a second threshold corresponding to a SDR maximum level, the branch level indicating a level at which a SDR opto-electrical transfer function (OETF) curve and a HDR OETF curve separate, and a reference level is matched to the SDR maximum level, the reference level corresponding to a transmission level of the HDR OETF curve at the second threshold.

14. The reception apparatus according to claim 13, wherein the HDR transmission video data is obtained by performing dynamic range conversion processing on the SDR transmission video data based on conversion information for converting a value of conversion data in accordance with a SDR photoelectric conversion characteristic into a value of conversion data in accordance with a HDR photoelectric conversion characteristic, the SDR transmission video data being obtained by performing, on the SDR video data, photoelectric conversion in accordance with the SDR photoelectric conversion characteristic.

15. The reception apparatus according to claim 13, wherein conversion information is inserted into the video stream and/or the container, the processing circuitry is further configured to extract the conversion information from the video stream and/or the container, and perform the dynamic range conversion based on the conversion information.

16. A reception method comprising:

receiving, by a receiver, a container having a predetermined format and including a video stream of encoded high dynamic range (HDR) transmission video data;

obtaining the HDR transmission video data by performing decoding processing on the video stream;

obtaining standard dynamic range (SDR) transmission video data by performing dynamic range conversion on the obtained HDR transmission video data; and obtaining display SDR video data by performing, on the SDR transmission video data, electro-optical conversion in accordance with a SDR electro-optical conversion characteristic, wherein the HDR transmission video data is converted when a transmission code value is greater than a first threshold corresponding to a branch level and lower than a second threshold corresponding to a maximum level, the branch level indicating a level at which a SDR opto-electrical transfer function (OETF) curve and a HDR OETF curve separate, and a reference level is matched to the SDR maximum level, the reference level corresponding to a transmission level of the HDR OETF curve at the second threshold.

* * * * *